(12) United States Patent
Stickle et al.

(10) Patent No.: US 9,686,121 B2
(45) Date of Patent: Jun. 20, 2017

(54) CLIENT-PREMISE RESOURCE CONTROL VIA PROVIDER-DEFINED INTERFACES

(71) Applicant: Amazon Technologies, Inc., Reno, NV (US)

(72) Inventors: Thomas Charles Stickle, Saint James, NY (US); Terrence Patrick Wise, Seattle, WA (US); Carl Jay Moses, Gainesville, VA (US)

(73) Assignee: Amazon Technologies, Inc., Reno, NV (US)

( * ) Notice: Subject to any disclaimer, the term of this patent is extended or adjusted under 35 U.S.C. 154(b) by 266 days.

(21) Appl. No.: 14/034,325

(22) Filed: Sep. 23, 2013

(65) Prior Publication Data

US 2015/0089034 A1     Mar. 26, 2015

(51) Int. Cl.
    *G06F 15/173* (2006.01)
    *H04L 12/24* (2006.01)

(52) U.S. Cl.
    CPC ............ *H04L 41/00* (2013.01); *H04L 41/28* (2013.01)

(58) Field of Classification Search
    CPC ............................... H04L 41/00; H04L 41/28
    USPC ........................................................ 709/223
    See application file for complete search history.

(56) References Cited

U.S. PATENT DOCUMENTS

| | | | |
|---|---|---|---|
| 6,536,043 B1 * | 3/2003 | Guedalia | H04N 7/147 348/E7.071 |
| 7,318,107 B1 * | 1/2008 | Menon | 709/239 |
| 7,373,363 B2 * | 5/2008 | Stephenson | G06F 8/65 |
| 7,487,534 B1 | 2/2009 | Peterka et al. | |
| 7,532,642 B1 * | 5/2009 | Peacock | H04L 43/0864 370/252 |
| 7,873,074 B1 * | 1/2011 | Boland | H04L 12/14 370/468 |
| 8,122,282 B2 | 2/2012 | Betzler et al. | |
| 8,250,215 B2 | 8/2012 | Stienhans et al. | |
| 8,260,840 B1 * | 9/2012 | Sirota | G06F 9/5061 370/216 |
| 8,261,295 B1 | 9/2012 | Risbood et al. | |

(Continued)

OTHER PUBLICATIONS

International Search Report and Written Opinion from PCT/US14/56915, mailed Dec. 17, 2014, Amazon Technologies, Inc., pp. 1-14.

(Continued)

*Primary Examiner* — Anthony Mejia
(74) *Attorney, Agent, or Firm* — Robert C. Kowert; Meyertons, Hood, Kivlin, Kowert & Goetzel, P.C.

(57) ABSTRACT

Methods and apparatus for client-premise resource control using provider-defined interfaces are described. A set of programmatic interfaces enabling clients to submit registration requests is implemented. A registration request indicates resources located at a data center external to a provider network as candidate targets for control operation requests issued via a different set of programmatic interfaces associated with a service of the provider network. A network connection is established between a particular resource indicated in a registration request, and an administrative resource located within a data center of the provider network. In response to a particular control operation request received via a programmatic interface of the different set, a control command is transmitted from the administrative resource to the particular resource via the network connection.

20 Claims, 15 Drawing Sheets

(56) References Cited

U.S. PATENT DOCUMENTS

| | | | |
|---|---|---|---|
| 8,271,536 B2 | 9/2012 | Amradkar et al. | |
| 8,271,653 B2 | 9/2012 | Dehaan | |
| 8,843,633 B2* | 9/2014 | Eriksson | G06F 9/5072 709/226 |
| 8,972,551 B1* | 3/2015 | Yanacek | G06F 15/173 709/200 |
| 9,032,077 B1* | 5/2015 | Klein | H04L 29/08 370/395.21 |
| 9,154,589 B1* | 10/2015 | Klein | H04L 69/329 |
| 9,270,690 B2* | 2/2016 | Kraitsman | H04L 63/1408 |
| 9,444,714 B2* | 9/2016 | Rodbro | H04L 43/0852 |
| 2001/0020273 A1* | 9/2001 | Murakawa | 713/201 |
| 2002/0010783 A1* | 1/2002 | Primak et al. | 709/228 |
| 2002/0040402 A1* | 4/2002 | Levy-Abegnoli et al. | 709/229 |
| 2003/0061356 A1* | 3/2003 | Jason, Jr. | 709/227 |
| 2004/0109410 A1* | 6/2004 | Chase | H04L 12/2602 370/229 |
| 2006/0095398 A1* | 5/2006 | Bhaskaran | H04L 29/06027 |
| 2006/0150157 A1 | 7/2006 | Fellenstein | |
| 2006/0190394 A1* | 8/2006 | Fraser | G06Q 40/00 705/38 |
| 2007/0174660 A1* | 7/2007 | Peddada | 714/4 |
| 2008/0049630 A1* | 2/2008 | Kozisek | H04L 41/0823 370/250 |
| 2008/0049640 A1* | 2/2008 | Heinz | H04L 41/0806 370/252 |
| 2008/0052719 A1* | 2/2008 | Briscoe | H04L 41/0806 718/104 |
| 2009/0271472 A1* | 10/2009 | Scheifler | G06F 9/485 709/202 |
| 2010/0064033 A1 | 3/2010 | Travostino et al. | |
| 2011/0029344 A1* | 2/2011 | Weiler | G06Q 10/087 705/7.35 |
| 2011/0055399 A1 | 3/2011 | Tung et al. | |
| 2011/0231525 A1 | 9/2011 | Balani et al. | |
| 2011/0239259 A1* | 9/2011 | Udani | H04L 12/2807 725/85 |
| 2012/0072597 A1 | 3/2012 | Teather et al. | |
| 2012/0110159 A1 | 5/2012 | Richardson et al. | |
| 2012/0117399 A1* | 5/2012 | Chan et al. | 713/320 |
| 2012/0124211 A1 | 5/2012 | Kampas et al. | |
| 2012/0226789 A1 | 9/2012 | Ganesan et al. | |
| 2012/0239739 A1 | 9/2012 | Manglik et al. | |
| 2012/0290725 A1* | 11/2012 | Podila | G06F 9/5011 709/226 |
| 2013/0074091 A1* | 3/2013 | Xavier | G06F 9/5011 718/104 |
| 2013/0152090 A1* | 6/2013 | Balko | G06F 9/52 718/102 |
| 2013/0159497 A1* | 6/2013 | Butler | G06F 21/6218 709/224 |
| 2014/0006480 A1* | 1/2014 | Dobrev | H04L 67/42 709/203 |
| 2014/0006482 A1* | 1/2014 | Raghu | H04L 67/10 709/203 |
| 2014/0006581 A1* | 1/2014 | Raghu | G06F 9/5072 709/223 |
| 2014/0025321 A1* | 1/2014 | Spanier | 702/62 |
| 2014/0075016 A1* | 3/2014 | Chatterjee | H04L 41/5041 709/224 |
| 2014/0189099 A1* | 7/2014 | Hurst | H04N 21/437 709/224 |
| 2014/0189143 A1* | 7/2014 | Muhlestein | H04L 65/60 709/231 |
| 2014/0223013 A1* | 8/2014 | Gaglianello et al. | 709/226 |
| 2015/0033297 A1* | 1/2015 | Sanso | H04L 63/104 726/5 |
| 2015/0039766 A1* | 2/2015 | Bachar | H04L 47/70 709/226 |

OTHER PUBLICATIONS

"Amazon Elastic Compute Cloud: API Reference" Nov. 2009 Amazon Web Services LLC. pp. 1-605.

"Amazon Simple Storage Service: API Reference" Mar. 2006 Amazon Web Services, Inc. pp. 1-280.

"AWS Cloud Formation User Guide API Version May 15, 2010" Amazon Web Service, May 15, 2010, pp. 1-480.

"Amazon Elastic Compute Cloud User Guide API Version Jul. 15, 2013" Amazon Web Service, Jul. 15, 2013, pp. 1-579.

"Elastic Load Balancing API Reference API Version Jun. 1, 2012" Amazon Web Service, Jun. 1, 2012, pp. 1-53.

U.S. Appl. No. 13/747,176, filed Jan. 22, 2013, Marcin Piotr Kowalski, et al.

U.S. Appl. No. 13/747,190, filed Jan. 22, 2013, Marcin Piotr Kowalski, et al.

U.S. Appl. No. 14/034,331, filed Sep. 23, 2013, Thomas Charles Stickle, et al.

Extended European Search Report for PCT/US2014056915, dated Feb. 16, 2017, Amazon Technologies, Inc., pp. 1-9.

* cited by examiner

CLIENT-PREMISE RESOURCE CONTROL VIA PROVIDER-DEFINED INTERFACES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Operators of networks that enable clients to use virtualized resources as needed simplify many aspects of application management, such as the responsibility for detecting and recovering from failures, scaling the infrastructure as workload increases, and so on. However, some enterprise IT (Information Technology) departments remain reluctant to commit to such cloud-based architectures, especially for legacy applications that have existed for long periods, applications that may deal with sensitive data sets, or applications that may utilize proprietary technologies providing competitive advantages. A sudden transition from implementing an application completely within client-owned premises to implementing the same application completely at a cloud provider's data centers may be too much of a leap for some organizations. Techniques that may help to ease the transition from client-premise applications to the cloud environment may be of great benefit, both to the cloud operators (whose revenues may increase) and the clients (whose costs may decrease).

Figure 1:
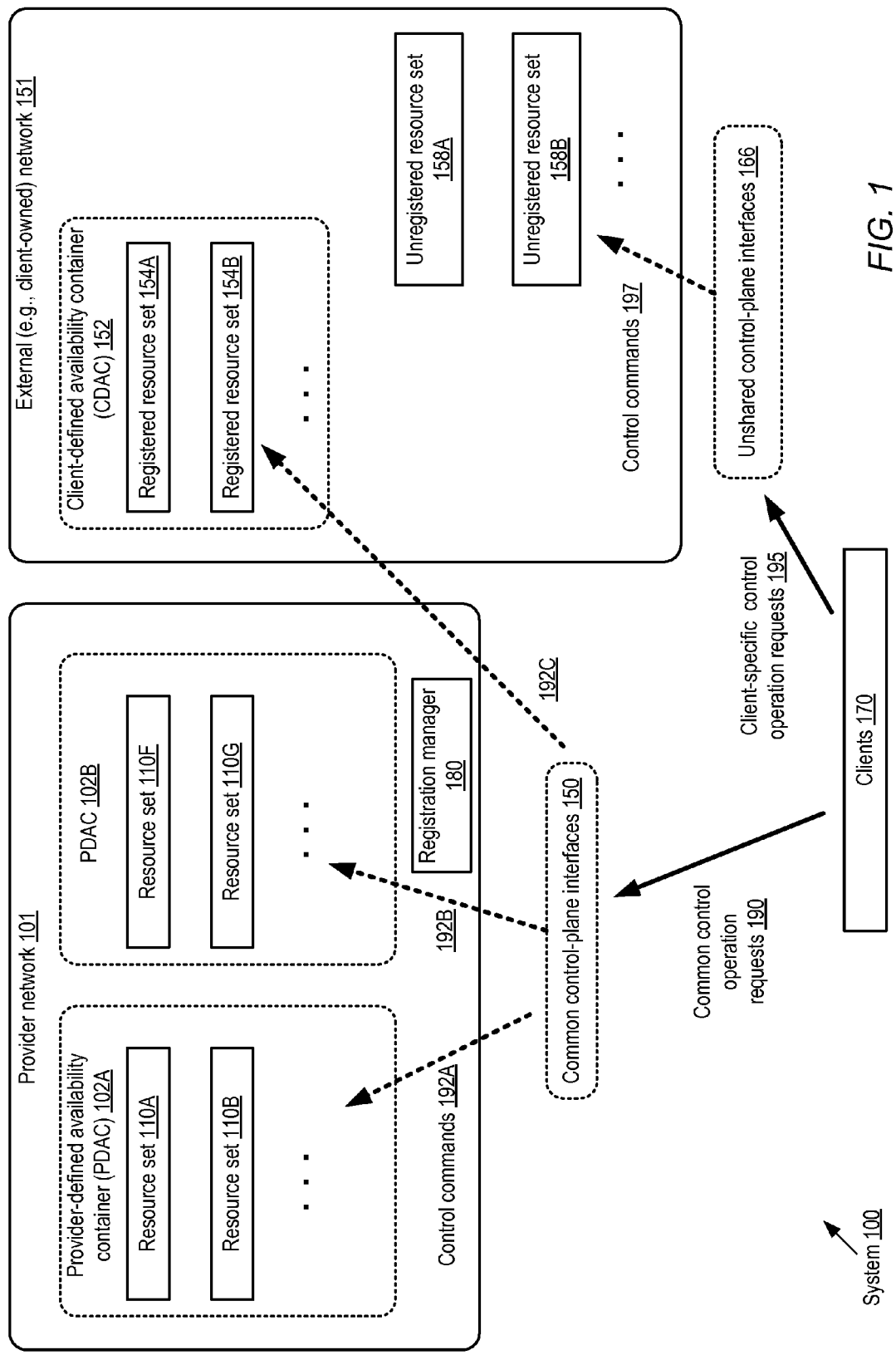
FIG. 1 illustrates an example of a system in which a common set of control interfaces may be used to manage resources at data centers within and outside a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for using programmatic control interfaces implemented at a provider network to help manage client resources located on premises outside the provider network are described. For example, client-owned virtualization hosts at a client's data center may be managed using the same set of control interfaces (e.g., web-based consoles or various types of application programming interfaces (APIs)) that clients can use to manage resources located at provider network data centers. Such an approach may make it much easier for clients to eventually transition applications to the provider network infrastructure, should such a change be desired.

Networks set up by an entity such as a company or a public sector organization to provide one or more network-accessible services (such as various types of cloud-based computing, storage or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network. The set of resources on client premises or at external data centers may collectively be referred to as a "client network" or "client-side resources" herein. It is noted that not all the resources in a client network need be owned by a client—e.g., a client may lease resources located at a third party's premises outside the provider network, and such leased resources may also be considered part of the client network.

Generally speaking, the network traffic flowing between various components of the provider network and its clients may be classified into two broad categories: data traffic and control traffic. The data traffic may comprise network transfers associated with client applications, such as transferring contents of a web page from a web site instantiated at a virtualized compute server within the provider network in response to an HTTP (HyperText Transfer Protocol) request from a client device. The control traffic may comprise network transfers associated with administrative tasks, such as configuration change commands transmitted from a controller device to a virtualization compute server, and the like. For security, performance, and other reasons, the data traffic and the control traffic may be kept logically isolated from each other as much as possible in at least some implementations (although, as described below, in at least some cases, network routes or links may be shared for both types of traffic). Accordingly, at least a subset of the resources and infrastructure components of a given provider network may be grouped into two categories in some embodiments: a "data plane" and a "control plane", used respectively for the flow of the data traffic and the flow of control traffic. Each plane may comprise a number of different types of resources, including for example networking devices such as routers, gateways, switches, and the like, networking links, storage devices and/or servers.

According to some embodiments, a provider network may implement a private network service, enabling clients to establish isolated virtual networks (IVNs) within the provider network. Such IVNs may be referred to in some embodiments as "Virtual Private Clouds" or VPCs. At least some of the network addresses configured for devices within an IVN may not be exposed or advertised outside the IVN. Clients may therefore be granted substantial flexibility regarding network configuration settings within an IVN, giving them similar levels of network-related administrative control with respect to the IVN as they would have over networks set up entirely within client-owned data centers. In at least some embodiments, a client may be able to set up a private gateway between a client network and an IVN, and/or may be able to establish connectivity between client premises and their IVNs using various types of secure network protocols such as Virtual Private Network (VPN) protocols and the like. In embodiments in which a client has set up an IVN, data traffic may flow seamlessly and securely between the client network and the IVN within the provider network, and thus the data plane of the provider network may be considered to be logically extended to the client network or to client premises.

While data traffic flow may be eased by the use of IVNs, at least in some cases clients may still have to use different sets of control interfaces for the resources on client premises than they use for managing resources within the provider network. For example, a web-based management console may be implemented to allow clients to request control operations on provider network resources, such as instantiating or stopping virtualized compute servers within an IVN, but a different set of interfaces may often be used to instantiate and stop compute servers within client data centers. Having to use two different sets of control interfaces may lead to substantial training costs for the IT staffs of client organizations, and may also result in greater reluctance with respect to moving applications to the provider network. Accordingly, in at least some embodiments, an operator of a provider network may provide a solution for extending aspects of the provider network control plane into client networks, thereby allowing a common set of control interfaces to be used to manage resources both within and outside the provider network.

According to one such embodiment, a first set of programmatic interfaces may be implemented, enabling a client to request control operations associated with resources of one or more network-accessible services of the provider network. In addition, a second set of programmatic interfaces may be implemented, enabling a client to indicate, via resource registration requests, client-side resources that are to be made controllable via the first set of programmatic interfaces. A resource registration request may, in such embodiments, indicate one or more resources located at a data center external to the provider network as candidate targets for a category of control operation requests received via the first set of programmatic interfaces. The category of control operation requests may be associated with at least some of the network-accessible services supported at the provider network. Depending on the implementation, only a subset of the categories of control operations permitted on resources located within the provider network may be supported on the resources to be registered from the external data center—for example, some types of security-related control operations that rely on specific hardware or software may only be supported within the provider network, or some types of reconfiguration operations may only be supported within the provider network. In some embodiments, components of the provider network termed registration managers may be responsible for receiving and responding to resource registration requests.

When a resource registration request is received, indicating a particular resource located at an external (e.g., client-owned) data center, in some embodiments one or more capabilities of the particular resource may be verified, e.g., by communicating with one or more management software stack components installed at the resource. For example, if the particular resource comprises a virtualization host at which one or more virtualized compute servers or instances are to be set up, a registration manager may verify that the virtualization management software stack at the particular resource is capable of responding to the kinds of control operation requests (such as requests to start or stop compute instances) that are typically issued to initiate similar operations at provider network hosts. In addition to a verification of compatibility with the programmatic control interfaces of the provider network, other aspects of the resource may also be verified (e.g., performance capabilities may be checked to ensure that the resource can support desired workload levels, security capabilities may be checked, and so on.) In some embodiments, one or more modules of the virtualization management software stack (e.g., hypervisor components, or administrative operating system components) may have to be installed at the client-side resource before the resource can be registered for control via the provider network's control plane. The modules may be required for various reasons, e.g., to ensure compatibility with the provider network control interfaces, to allow resource monitoring in a manner similar to the way provider network resources are monitored, and so on. Installation of the modules may be performed as a preliminary step by the client in some embodiments, e.g., by downloading the appropriate installation packages from a provider network resource and installing such packages prior to submitting the registration request. In one implementation, the transmission of the installable software may be initiated from the provider network resource to a destination device in a client data center, e.g., in response to a resource registration request. In some embodiments, hardware and/or software vendors that are partners of the provider network operator may bundle the needed modules in their own hardware/software stacks, thus relieving the clients from the burden of having to install the modules later. Thus, in at least some embodiments, no additional software installation steps may be needed for client-side resources to be registered; i.e., the registration candidates may come pre-installed with the necessary software stack components. In at least some cases, e.g., when the client-side resource specified in the registration request comprises a host or device from a partner vendor, the verification of resource capabilities may not be required. Modules installed in some embodiments at the client-side resources to facilitate control operations made using the provider network's control plane interfaces may be referred to as "control modules" or "control-plane modules". As described below in further detail, in some cases pools or groups of resources located at facilities external to the data center may be managed using the provider network's control interfaces without requiring control modules on each of the group members—e.g., a single appliance configured with a compatible control module may be usable to manage a pool of client-side resources.

In at least some embodiments, a secure network connection may be established between the client-side resource and an administrative resource located within a data center of the provider network. In some embodiments in which capability verification of the type described above is performed, such a connection may be established as part of the verification procedure, while in other embodiments the secure connection may be established independently of the verification (e.g., either prior to or after the verification). If, for example, control commands associated with service S1 are to be used to manage the client-side resource, a controller node or some other administrative component of S1 may be connected securely to a control-plane module at the client-side resource, using a protocol such as IPSec (Internet Protocol Security), TLS (Transport Layer Security), or SSL (Secure Sockets layer). In some embodiments, a proxy server at the provider network may be used for the secure connections, e.g., traffic between client-side resources and service administrative nodes of one or more provider network services may be routed through an intermediary proxy. The secure network connection may utilize one or more network links and/or devices that are already configured for data traffic flow between the provider network and the client network in at least some embodiments—e.g., if the client had previously established an IVN, the network links in use for the IVN data traffic may also be used for a virtual private network (VPN) connection for control traffic.

In various embodiments, the establishment of the secure connection may, in effect, extend at least a portion of the control-plane of the provider network into the client network. Subsequently, with respect to managing the registered resources, clients may be able to submit control operation requests using the same set of interfaces (e.g., consoles or APIs) that can be used to manage similar resources instantiated within the provider network's data centers. Thus, for example, in response to a particular client-submitted control operation request belonging to a category of control operation requests for which control-plane modules have been installed/verified at the client-side resources, a control command may be submitted from a service controller node within the provider network to the appropriate client-side resource via the secure network connection. From the perspective of administrative control, after the control plane has been extended as described, the registered client-side resources may appear to be indistinguishable from (or at least very similar to) the resources that are resident within the provider network.

In at least some embodiments, after clients register their resources for control via provider network defined interfaces as described above, moving applications from the client premises to the provider network may become much easier. For example, using the common control interface, a client may be able to quiesce or pause a virtualized resource (such as a compute server running a portion of a client application) at a client-side host, and re-instantiate the virtualized resource at a different host within the provider network.

In addition, in some embodiments clients may be able to use a configuration service implemented by the provider network to set up complex, multi-layer applications using a combination of client-side and provider network resources. For example, a client may wish to set up a multi-tier web application, comprising a set of web servers, a set of application servers and a set of database servers. A script or template specifying the various components may be submitted to a configuration service node at the provider network, and the configuration service may submit the needed configuration commands to bring up the various servers making up the tiers. Using the control-plane extension approach described above, some of the servers (e.g., one or more of the database tier servers) indicated at the script may be instantiated at client-side resources, while others (e.g., one or more of the web servers or the application servers) may be instantiated using provider network resources.

Control-plane extensions similar to those described above may be used for a variety of different services implemented in the provider network in different embodiments. For example, such approaches may be used to allow clients to submit control commands for virtualized computing services (e.g., to launch, quiesce, restart or stop virtualized compute servers or "compute instances"), block-level virtualized storage services that support virtualized volumes, object storage services that expose unstructured storage objects via web services APIs rather than block-level APIs, database services, parallel processing services of various kinds including batch parallel processing services, and the like. In some embodiments, a given control module installed at a client-side resource may be able to respond to administrative commands associated with several different provider network services, while in other embodiments, different client-side modules may be needed for different services. Similarly, in some embodiments, for each service, a respective secure connection may have to be established between a service administrative resource on the provider network end and a control module installed at a client data center, while in other embodiments, a single secure connection may be used for several different services. According to one embodiment, at least some of the services for which control-plane extension is implemented may not involve the use of virtualization (and hence the resources registered for such services may not require any virtualization software). In some embodiments, control operations for services used for managing pools of resources (e.g., pools of load balancers or pools of cache devices) may also be implemented using similar approaches, as described below in further detail.

In at least some embodiments, e.g., to enable support for high availability, data durability and resiliency to failures, the resources of a provide network may be arranged in a plurality of provider-defined availability containers (PDACs). A PDAC may comprise a portion or all of one or more data centers in such embodiments, and may be engineered in such a way as to prevent various types of failures within a given availability container from impacting operations at other availability containers. Thus, for example, a particular PDAC may comprise a set of hardware, software and infrastructure components (such as power supplies, power distribution units, cooling/heating equipment, networking equipment and the like) that has a failure profile (e.g., a probability distribution over time of various types of faults or errors) that is not expected to be correlated with the failure profile of a different PDAC. Each PDAC may itself be designed to have very low failure rates, along with the isolation characteristics that prevent cascading faults across multiple PDACs. The implementation of numerous PDACs capable of containing failures within their boundaries may thus help support highly reliable and durable services—e.g., in one implementation, N replicas of the same database table partition may be stored at each of N different PDACs so that the partition remains accessible even if N−1 PDACs happen to become unavailable at once, reducing the probability of a complete outage to very near zero. In at least some embodiments, the resources of a geographically distributed provider network may be organized into a hierarchy of geographical regions, with each region comprising some number of PDACs, and each PDAC comprising part or all of one or more data centers.

In some embodiments in which resource registrations for control-plane extensions of the kinds described above are supported, clients may be able to assign groups of registered resources to client-defined availability containers (CDACs). Thus, if a client has two data centers, to each of which the provider network control plane associated with one or more services has been extended, the collection of registered resources within one data center may be designated as members of a first CDAC, while the collection of resources registered within the second data center may be designated as members of a second CDAC. Clients may not need to conform to the same availability and failure-containment requirements for CDACs as the provider network does for PDACs in at least some embodiments. Instead, in such embodiments, clients may use the pre-existing resiliency and fault-containment policies that they already use at their data centers, or may define new requirements or policies for their CDACs. When specifying where a particular resource of a service is to be activated or configured, in some embodiments clients may be able to indicate either a target PDAC, a target CDAC, or allow the service to choose a PDAC or CDAC. In contrast to PDACs, at least some of which may include resources allocated to a plurality of different client entities or organizations, a CDAC may be dedicated for use by a single client entity or organization in at least some embodiments. In other embodiments, multiple client entities may share access to the same CDAC.

According to at least one embodiment, some of the network-accessible services supported within a provider network may be used for managing pools of resources rather than just individual resources. For example, a flexible load balancing service may be implemented in one embodiment, which enables workload-based dynamic activation and deactivation of members of a pool of load balancers associated with one or more applications. Similarly, in another embodiment, a distributed caching service may be implemented, in which the number of caches instantiated may be adjusted as needed. In one embodiment, in addition to or instead of the registration-based control plane extension techniques described above for individual client-side resources, additional levels of control plane extension may be supported to allow specified pools of client-side resources to be managed using control plane interfaces of the provider network. As described below in further detail, the resources of the client-side pools may not require any modifications such as additional control modules to be installed in at least some embodiments. Instead, in such embodiments, a dedicated appliance set up within the client data center may host control-plane modules securely connectable to administrative nodes of the pooled-resource service within the provider network, e.g., using VPNs or other techniques similar to those described earlier. The appliance may serve as the intermediary between the service administrative nodes on one side, and the client-side resource pool members on the other. From the perspective of the client in such embodiments, pools of unmodified client-side resources may be configured to be controllable using a provider network service's control commands. In some embodiments, as also described below, at least some of the client-side pool members may comprise registered resources that are already controllable via an interface implemented for a different provider network service. Thus, for example, a pool of N load balancers located at a client data center may be configured for control via a programmatic interface associated with a load balancing service LBS, while at the same time, at least some subset of the N load balancers may themselves be implemented using compute instances configured for control using programmatic interfaces of a virtualized computing service VCS.

The network-accessible services implemented to help clients manage pools of resources may be collectively be termed pooled-resource services herein. Examples of pooled-resource services in various embodiments may include load balancing services, distributed caching services, resource recruitment services (e.g., a service that automatically scales the number of compute instances spun up for a client's application set as needed), security artifact generation services (e.g., a service that produce encryption keys, certificates and the like on demand using a collection of specialized hardware or software security modules), network address discovery services (e.g., a service that responds to address resolution queries using a collection of name server nodes), and distributed database services (in which the number of active database instances may be increased or decreased based on demand).

Activation and de-activation of pool members, e.g., based on various criteria such as measured or anticipated workloads, client budget limits, and the like, may represent one of the core functionalities of a pooled-resource service in various embodiments. Clients of such services may be able to submit, via one or more programmatic interfaces in some embodiments, various types of configuration requests including requests that lead to changes in the activation status of pool members within the provider network. A particular type of configuration request (which may be termed a pool instantiation request or a pool extension request, or more generally a pool management request) may allow clients to also indicate client-side resources (i.e., resources located outside the provider network) whose activation status within a specified pool is to be managed by the pooled-resource service. A secure network connection (e.g., using SSL, TLS, or IPSec) may be established from an administrative resource of the pooled-resource service, located within the provider network, to a control module instantiated on behalf of the pooled-resource service at a client-side location (e.g., in a client's data center). Based on resource activation criteria indicated by the client, various client-side resources may be activated and deactivated by the pooled-resource service. Clients may also indicate various parameters for the resource pools using programmatic interfaces in various embodiments, such as the minimum and maximum number of pool members that can be activated or that can be made members, identification information (e.g., network addresses) of the members, and so on.

In some implementations, as described above, a dedicated appliance may be instantiated at the client-side location to implement the extended control plane and manage resources of client-side resource pools. Control modules installed on the appliance may considered software intermediaries between control plane components in the provider network, and pooled resources in the client network. Any appropriate protocol may be used to activate, quiesce, shut-down, or perform other configuration changes on client-side resources in various embodiments, including for example, the Simple Network Management Protocol (SNMP) or UDP (the User Datagram Protocol). In some embodiments, communications between service administrative components (e.g., service controllers located within the provider network) and the appliance may be formatted in accordance with industry standards such as JMX (the Java™ Management Extensions architecture). In other embodiments, such a dedicated appliance may not be used; instead, control-plane modules compatible with the pooled-resource service may be installed on at least some of the pool members themselves. In at least some embodiments, a hybrid approach may be supported, in which some of the client-side pool members may have the control modules associated with one or more provider network services installed, while others may not. In some implementations, control modules associated with more than one service (e.g., a load balancing service and a virtualized computing service, or a database service, a caching service and a storage service) may be installed on the same client-side resource. In some embodiments, a pool of resources to be managed using the control plane extension techniques may include both client-side resources and provider network resources, and the resource pools may thus cross data center boundaries or availability container boundaries.

Example System Environment

FIG. 1 illustrates an example of a system 100 in which a common set of control interfaces may be used to manage resources at data centers within and outside a provider network, according to at least some embodiments. As shown, system 100 comprises various sets of resources located within a provider network 101 and in an external network 151 (e.g., a client-owned, client-managed, or third-party network). The provider network may include a plurality of provider-defined availability containers (PDACs) 102, such as PDAC 102A and 102B. Each PDAC may comprise portions or all of one or more data centers, and the infrastructure components (such as power, cooling, networking, and security-related components) of each PDAC may be engineered and isolated in such a way that the probability of a failure within one PDAC affecting operations in other PDACs may be very low. That is, each PDAC may have its own availability profile, independent of the availability profile of other PDACs.

In the depicted embodiment, a set of common control-plane interfaces 150 associated with one or more network-accessible services of the provider network may be used by clients 170 to submit control operation requests 190 (e.g., configuration/administration requests of various kinds) directed at resources of the provider network. Various clients 170 may be granted administrative access to respective sets of logical and/or physical resources (e.g., resource sets 110A, 110B, 110F or 110G) within the PDACs of the provide network. Depending on the specific services being implemented at a resource on behalf of a client, and the client's administrative permissions, each such client may issue certain categories of control operation requests 190 directed to the resource via the common control-plane interfaces 150. Within the provider network, the control operation requests may be translated into control commands 192, such as commands 192A and 192B. In some embodiments, one or more network endpoints (e.g., a web-accessible console, or a set of network addresses associated with endpoint devices) may be exposed to receive control operation requests 190 from clients 170, and to provide responses to such requests. The control plane of the provider network may thus comprise such endpoints, other devices (not shown in FIG. 1) that are dedicated to administrative operations or configuration management within the provider network 101, as well as the programmatic interfaces and network paths used for control-related network transfers.

In the depicted embodiment, a client may be able to request an extension of the provider network's control plane, e.g., by registering various resources located within an external network 151 as candidates targets for at least some categories of control operation requests received via common control-plane interfaces 150. For example, a client 170 may submit a resource registration request via a particular programming interface to a registration manager 180, indicating that the client 170 would like one or more resources in a resource set 154A to be configured as targets for control operations of category C1 associated with a service S1 of the provider network. Another resource registration request may indicate resources of resource set 154B as potential targets for control operations of category C2 of service S2. In some implementations, multiple resource sets and multiple requested categories of control operations (potentially associated with several services) may be indicated in a single resource registration request. In some embodiments, the categories of control operation requests supported at a resource at an external network 151 for a given service S1 may not overlap completely with the categories of control operations supported at a resource within the provider network 101—e.g., the hardware and/or software stack used for the client-side resource may not be capable of performing all the types of configuration operations that are supported at the provider network resource. In other embodiments, all the types of control operation requests that are supported for provider network resources for a given service may also be supported at registered resources outside the provider network.

In at least some embodiments, control modules compatible with the provider network services may have to be installed (e.g., either on the registered resources themselves, or on other devices/appliances within the external network 151) in order for the control commands to be implemented correctly. For example, in the case of control commands associated with a virtualized computing service, one or more such control modules of a virtualization management software stack (e.g., a hypervisor, or an operating system instance designated for administrative tasks) may have to be installed. In addition, in at least some implementations, a secure network connection may have to be established between a control module and an administrative resource (e.g., a service controller) located within the provider network 101. The functionality of the control module and the secure network connection may have to be verified in order for the registration to be considered complete in at least some implementations. After the client-side resources have been successfully registered by the registration manager 180, clients may submit control operation requests directed to the registered resources via the interfaces 150, and corresponding internal control commands 192C may be directed to the client-side registered resources. It is noted that although registration manager 180 is shown as a single entity in FIG. 1, in various embodiments the functionality of the registration manager may be implemented using a plurality of hardware and/or software components of the provider network, and that some of the components may be located in different data centers or availability containers than others.

In the depicted embodiment, in addition to registering specified resources for the extended control plane of the provider network, a client 170 may also request the designation of some collection of client-side resources as members of an availability container. Thus, for example, registered resource sets 154A and 154B are designated as members of client-defined availability container (CDAC) 152. Clients 170 may implement different availability containment and fault-resilience policies for CDACs than those used by the provider network for PDACs in at least some embodiments—e.g., clients may not be obligated to support the same data durability or fault tolerance levels as are supported by the provider network. In at least some embodiments, for some types of control operations (such as requests to launch compute instances associated with a virtualized computing service), a target availability container may have to be selected by the requester of the control operation (e.g., an availability container within which the compute instances are to be launched). In some such embodiments, PDACs and CDACs may be treated equivalently for such control operations—e.g., a client may be allowed to specify a target PDAC 102 or a target CDAC 152, as desired. In some embodiments, a given client 170 may be allowed to set up multiple CDACs 152, each with its own availability profile and policies.

The external network 151 may include both registered resources sets (such as 154A and 154B) and unregistered resource sets such as 158A and 158B in the depicted embodiment. That is, for some client-side resources, control-plane interfaces 166 that are not necessarily supported by the provider network, and hence may be termed "client-specific" or "unshared" herein, may be used. To manage the registered resources within external network 151, control operation requests may be submitted using the common control-plane interfaces 150, and to manage the unregistered resources, client-specific control operation requests 195 may be submitted via different control interfaces, such as client-specific or unshared interfaces 166. The client-specific control operation requests 166 may be translated into control commands 197 directed to the unregistered resources. Using the hybrid approach illustrated in FIG. 1, clients 170 may be able to obtain the benefits of using a common set of provider-defined control interfaces for some subset of their resources, while retaining the ability to manage another subset of their resources using client-specific or unshared control interfaces. Some clients may wish to use the unregistered resource sets 154A and 154B for highly sensitive applications, for example, until they are ready to attempt a gradual transition to using the provider network for those applications. The transition may involve implementing the applications at a set of registered resources initially, and ensuring that any problems encountered when using the common set of control interfaces 150 are resolved, and then, eventually, moving the applications to the provider network.

Shared Network Links for Data and Control

Figure 2:
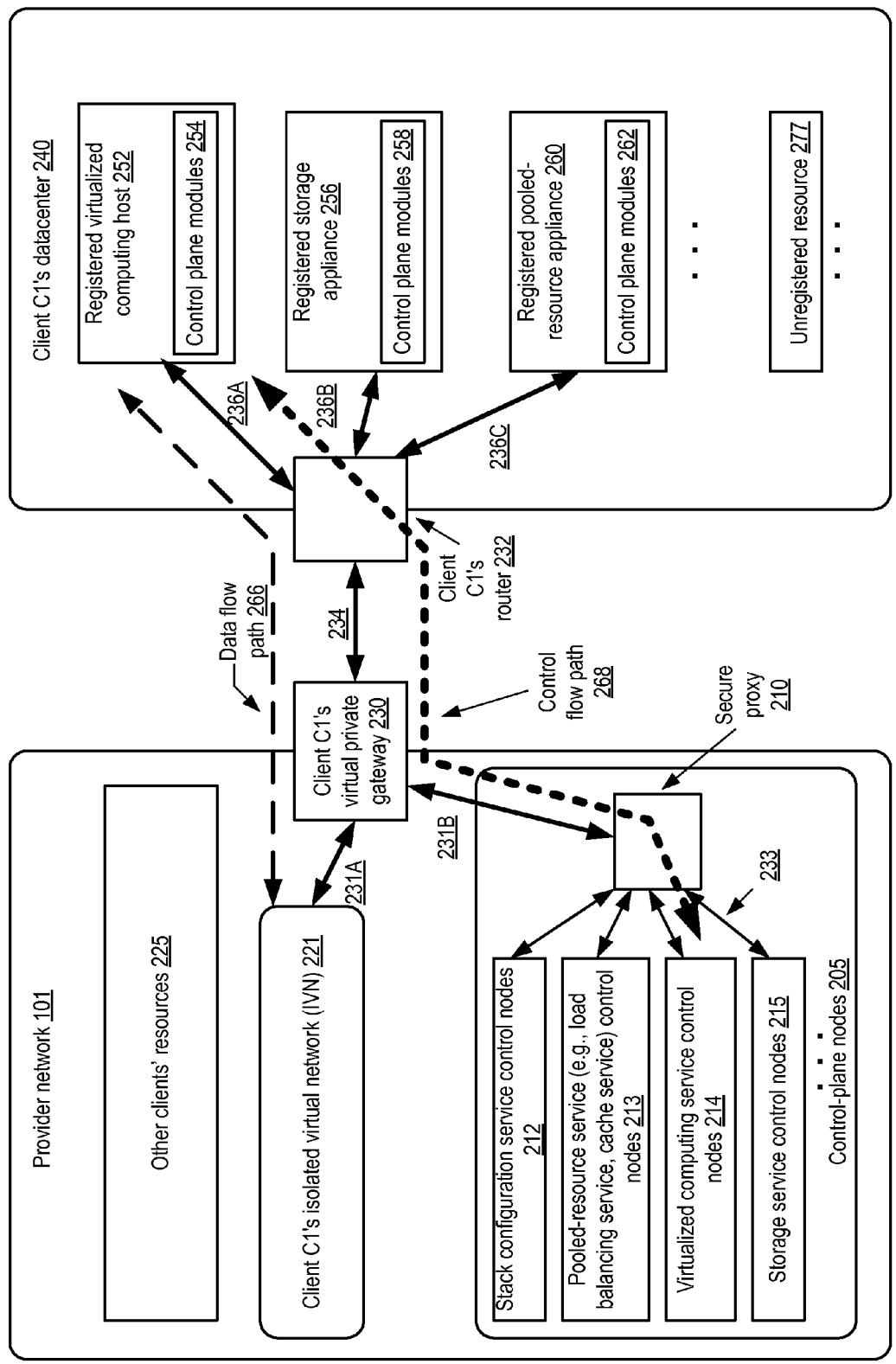
FIG. 2 illustrates an example of a data flow path and a control flow path between a provider network data center and an external data center, according to at least some embodiments.

In at least some embodiments, a network path set up for data transfers between a client data center and a provider network may also be configurable for control-plane network transfers, e.g., using a virtual private network (VPN) connection set up for control traffic. That is, the same network link or links may be shared for both data flow and control flow between the provider network and a client-side data center. FIG. 2 illustrates an example of a data flow path and a control flow path between a provider network data center and an external data center, according to at least some embodiments. An isolated virtual network (IVN) 221 has been set up using a subset of provider network 101's resources on behalf of a client C1 in the depicted embodiment. The provider network 101 may also include other clients' resources 225, some of which may not be included within other IVNs. As described earlier, an IVN may be logically isolated from other resources (including other IVNs) of the provider network 101. Client C1 may perform various types of networking-related configuration operations within IVN 221, such as selecting IP address ranges, creating subnets, configuring routing tables and gateways, security settings, and the like, with a similar level of flexibility as would be possible on a network within the client's own facilities such as data center 240. A data flow path 266 between the IVN 221 and the client C1's data center 240 may have been established. The data flow path 266 may include a virtual private gateway 230 set up for C1's traffic, as well as a router 232 associated with the client data center 240. Data flow path 266 may include network links 231A between IVN 221 and the virtual private gateway 230, links 234 between the virtual private gateway 230 and router 232, and links 236A, 236B and 236C within client data center 240 in the depicted embodiment.

Control operation requests transmitted by client C1 using the provider network's control interfaces may be handled by various service control-plane nodes 205 in the depicted embodiment. For example, control operations related to a virtualized computing service may be handled by nodes 214, control operations related to a storage service may be handled by nodes 215, control operations related to pooled-resource services such as load balancing service or a distributed caching service may be handled by nodes 213, and control nodes related to a stack configuration service may be handled by nodes 212. The control-plane nodes associated with a given service may also be referred to herein as "service controllers" or simply "controllers". Additional details regarding the stack configuration service and various pooled-resource services are provided below.

Using the client-side resource registration capabilities described earlier, client C1 may have registered several of the resources at data center 240 as candidates for control via the provider network 101's control interfaces in the depicted embodiment. As shown, a virtualized computing host 252, a storage appliance 256, and a pooled-resource appliance 260 may each have been registered in the depicted example for control via the interfaces used for corresponding services implemented within the provider network. Each of the registered resources in the depicted embodiment may have a corresponding set of control plane modules (which may also be referred to herein simply as control modules) installed. For example, registered virtualized computing host 252 may include control modules 254 (e.g., modules incorporated within a virtualization management software stack, or an operating system instance set up on the host for administrative purposes), registered storage appliance 256 may include control modules 258, and registered pooled-resource appliance 260 may include control modules 262. In some embodiments, the control modules may be pre-installed by the vendors responsible for supplying the resources to the client data center. In other embodiments, the modules may be installed from the provider network—e.g., installation packages may be transmitted from the provider network to the client network. A secure control flow path 268 may be established between the control plane nodes 205 located within the provider network 101 and the control-plane modules installed at the registered resources within the client data center 240 in the depicted embodiment. Encryption-based protocols such as TLS, SSL or IPSec may be used to secure the connections between the client-side control-plane modules and the provider network. The control flow path may include a secure proxy 210, such as an IPSec proxy, in some embodiments. As shown, at least some of the network links that are used for data flow path 266 (e.g., links 234, 236A, 236B and 236C) may also be shared by the control flow path 268. At least in some embodiments, the control traffic may be kept isolated from the data traffic using any of various network isolation techniques, such as various kinds of VPN protocols.

When client C1 wishes to register another resource (e.g., one of the currently unregistered resources 277) in the embodiment depicted in FIG. 2, the registration manager 180 (not shown) may be responsible for verifying that the resource has the appropriate control-plane modules, and for establishing a secure connection between the control-plane module on the client-side resource and the appropriate service controllers in the provider network. If and when client C 1 wishes to un-register a resource in the depicted embodiment, the registration manager 180 may terminate the secure connection (unless it was being shared for control traffic associated with other services) and in some cases the control modules at the resource may be uninstalled.

Application Stacks Combining Client-Side and Provider Network Resources

Figure 3:
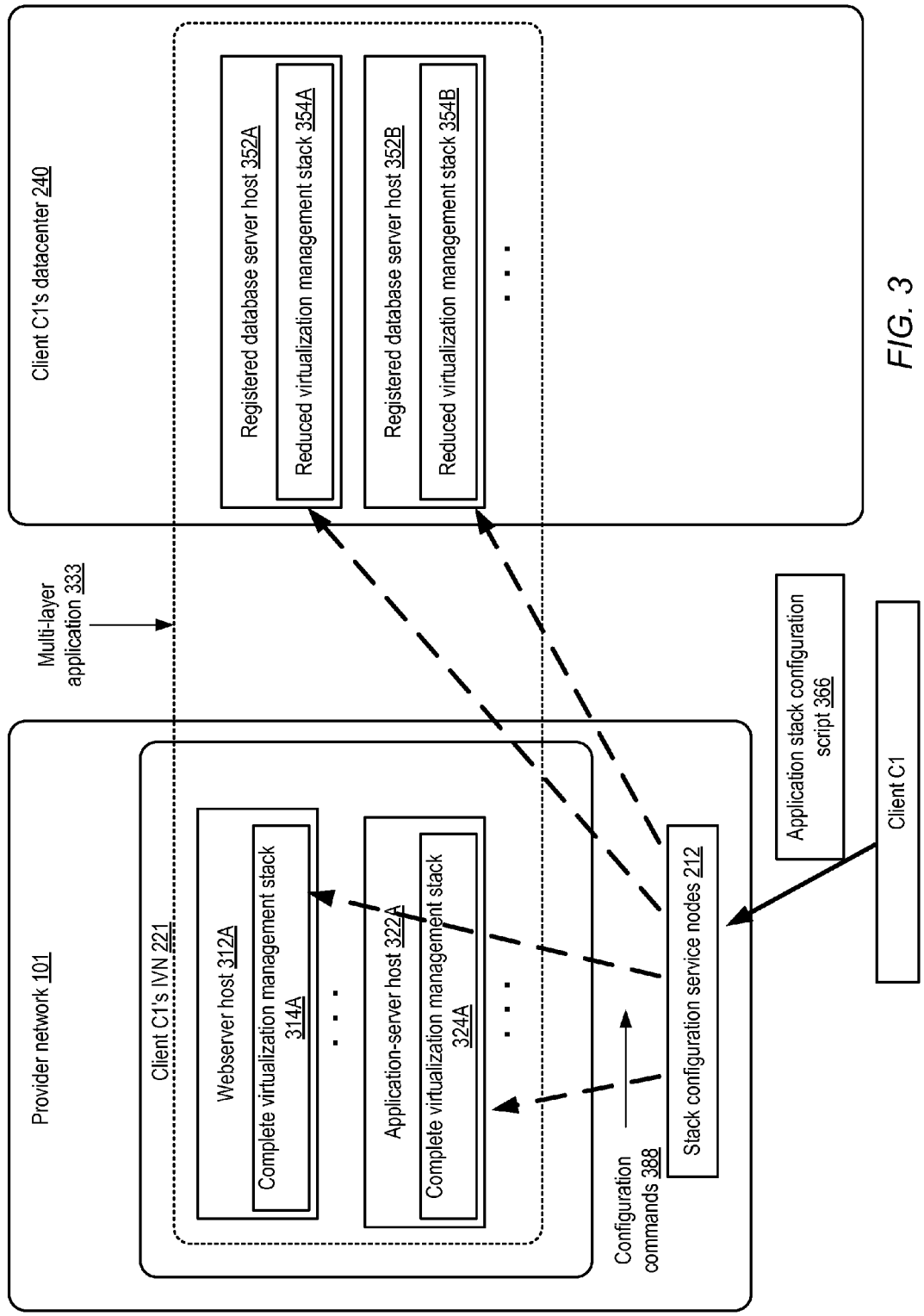
FIG. 3 illustrates an example configuration of a multilayer application that relies on a combination of provider network resources and external resources, according to at least some embodiments.

Once the control plane of the provider network has been extended using the techniques described above, new types of application configurations may become feasible. For example, with respect to application hosting, the registered resources at a client data center may be treated in a manner very similar to the resources located within the provider network. FIG. 3 illustrates an example configuration of a multi-layer application that relies on a combination of provider network resources and external resources, according to at least some embodiments. As shown, clients 170 may submit application stack configuration scripts 366 to control nodes 212 of a stack configuration service implemented by the provider network. The stack configuration service control node 212 may then perform the requested configuration, by transmitting the required configuration commands 388 to the resources indicated in the script.

In the depicted example, a client C1 has decided to combine database resources located within data center 240, with application server and web server resources located within the provider network 101, into a single multi-layer application. Accordingly, two database server hosts 352A and 352B, at which for example instances of a database management system may be instantiated, have been registered for the extended control plane of the provider network. The database server hosts 352 may each have a respective virtualization management stack 354, e.g., virtualization management stack 354A on database server host 352A, and virtualization management stack 354B on database server host 352B. In the depicted embodiment, the virtualization management stacks on the registered database server hosts may be referred to as "reduced" virtualization management stacks, as they may not include all the components of the virtualization management stacks that are installed at hosts within the provider network. For example, in C1's IVN 221 within the provider network, the application server host 322A may have a complete virtualization management stack 314A installed, and the web server host 312A may have a complete virtualization management stack 324A installed. In some embodiments, for example, the complete virtualization management stacks may include a variety of modules that may not necessarily be useful within a client data center—for example, billing-related modules that are used for determining usage-based billing amounts for provider network resources and may therefore not be required in client networks, monitoring modules that may require interactions with a monitoring service that is only implemented within the provider network, and so on. In one implementation, only the minimum set of modules necessary to perform the categories of resource control operations for which the client-side resources are registered may be deployed at the client-side resources, thus reducing the installation space and run-time resources needed for the client-side control-plane modules. As noted previously, in at least some embodiments hardware and/or software vendors may partner with the provider network operator to pre-install the required control-plane modules on the resources located within client data centers.

After the script 366 is processed by the stack configuration service nodes, and the corresponding configuration commands 388 are successfully completed, the multi-layer application may be made accessible to work requests from users. From the perspective of the users as well as the client C1, the fact that some of the resources used for the application are located at a client data center, while others are located in the provider network, may not be apparent. After the application in its depicted configuration is run for a while, in some embodiments client C1 may transition the database instances to the provider network as well, e.g., by quiescing the database instances at their client-side locations and re-instantiating them at provider network resources. Similar approaches may be taken with other client-side resources as well, e.g., virtualized compute instances used for other applications may be moved to registered hosts at the client data center, and then eventually to hosts at the provider network.

Registration Interactions

Figure 4:
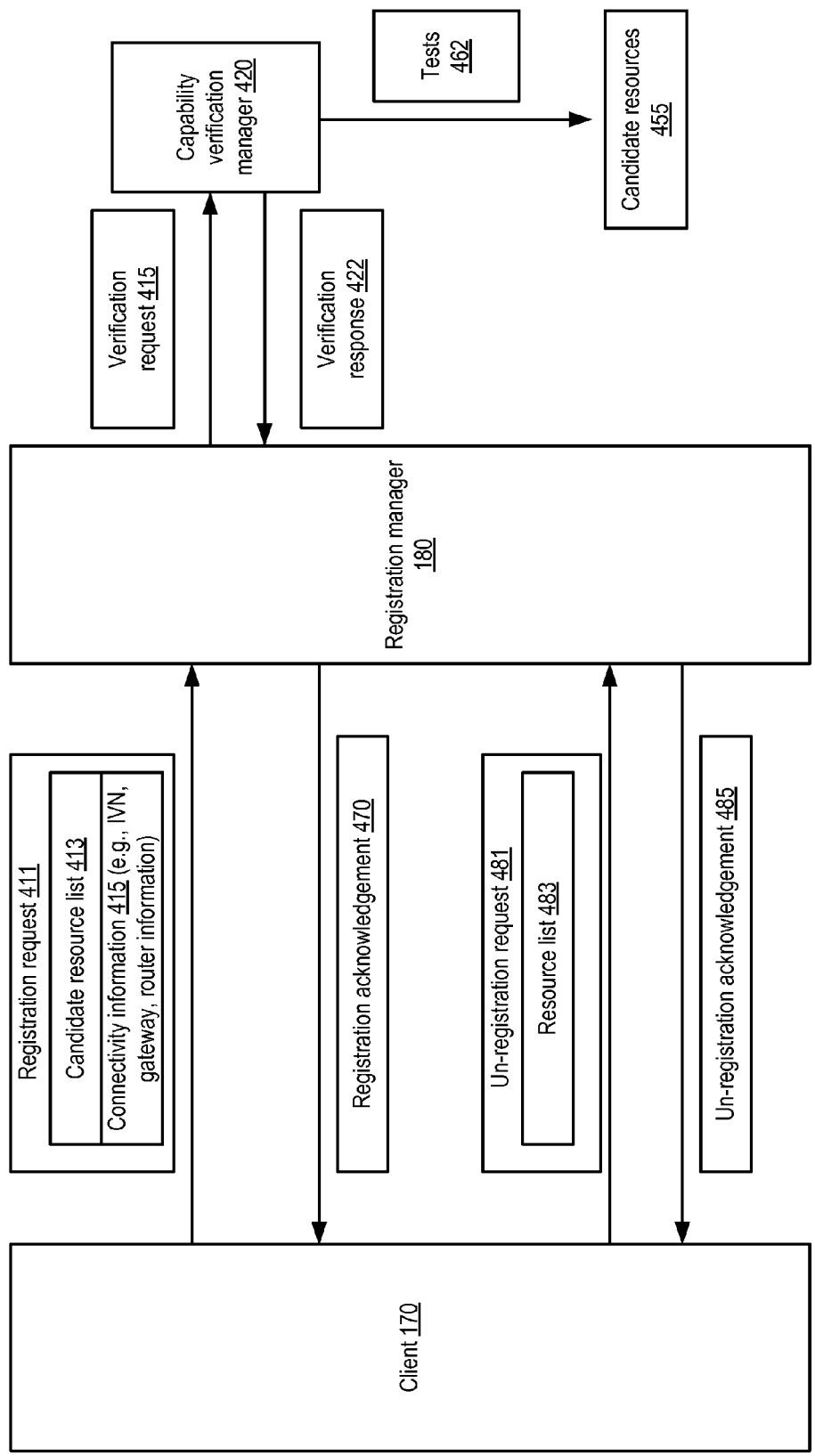
FIG. 4 illustrates examples of interactions between a client and a registration manager configured to register client-specified resources as candidate targets for control operations, according to at least some embodiments.

FIG. 4 illustrates examples of interactions between a client and a registration manager 180 configured to register client-specified resources as candidate targets for control operations, according to at least some embodiments. As shown, a client 170 may submit a registration request 411 to registration manager 180. The registration request may indicate a candidate resource list 413, as well as connectivity information that can be used to establish the secure connection for the control path to the candidate resources. The connectivity information may include, for example, an indication of an isolated virtual network that the client has already established (whose data flow path may be sharable by the control path), an identification of various network devices such as gateways, routers and the like that can be used for the control path, the specific protocols to be used for the connection (e.g., SSL versus TLS versus IPSec), whether a VPN is to be set up for the control traffic, and so on. For each candidate resource, in some implementations the registration request may also indicate the specific provider network services that are to be supported at that resource—e.g., some resources may be designated as virtualization hosts for compute instances, others for database management server instances, others for block-storage volumes, and so on.

In response to the registration request 411, the registration manager 180 may be responsible for verifying one or more capabilities of control software modules at the registration candidates in the depicted embodiment. For example, if the candidate resources comprise virtualization hosts at which compute instances are to be set up, the registration manager may need to determine whether the virtualization management software stack installed at the hosts is capable of instantiating compute instances with the desired properties (e.g., the desired operating system versions, the desired performance capabilities, and so on). Similarly, if one of the resources is to be registered to perform activations/deactivations for client-side pooled resources (as discussed in greater detail below) using a protocol such as SNMP, the registration manager 180 may need to ensure that the control modules at such a resource are capable of submitting SNMP messages in response to commands from the provider network pooled-resource service controllers. Various other capabilities (e.g., performance capabilities, security capabilities and the like) and functions of control modules at the registration candidates may need to be verified in different embodiments, depending for example on the categories of control operations that are to be supported at the registered resources for various provider network services.

In the embodiment shown in FIG. 4, the registration manager 180 may submit a verification request 415 to an intermediary such as a capability verification manager 420. The capability verification manager 420 in turn may execute one or more tests 462 at the candidate resources 455, e.g., to check whether the candidate resources are capable of performing the desired functions in response to control commands. Results of such tests 462 may be provided to the registration manager 180 in the form of verification response 422. If the verification response is affirmative, e.g., if the candidate resources 455 are found to be capable of performing the desired functions, the registration manager 180 may send a registration acknowledgement 470 to the client, indicating that the candidate resources have been successfully registered. In some embodiments, an intermediary between the registration manager 180 and the candidate resources 455 may not be required, and any verification-related operations may be performed by the registration manager 180 itself. In some embodiments, no verification of resource capabilities may be required, and the registration manager 180 may register the candidates indicated in the registration request without further checking or analysis.

After the resources have been registered, the clients may manage the registered resources using control operation requests sent via control interfaces of the provider network. For example, compute instances may be set up on client-side registered resources, storage volumes may be set up on client-side storage devices, pools of client-side load balancers may be assigned to applications, activated or deactivated in response to changing workloads, and so on. In some embodiments, clients 170 may unregister client-side resources (i.e., disable the capability of controlling previously registered resources via provider network control interfaces). In the depicted embodiment, for example, an un-registration request 481 identifying a list of resources 483 to be unregistered may be sent to the registration manager 180. In response, the registration manager 180 may close the secure connections set up for the identified resources, and send an un-registration acknowledgement 485 back to the client. In some implementations, one or more control modules may be uninstalled at the unregistered resources. As mentioned earlier, in at least some embodiments the registration manager 180 may comprise a plurality of hardware and/or software components.

Methods for Extending Provider Network Service Control-Planes

Figure 5:
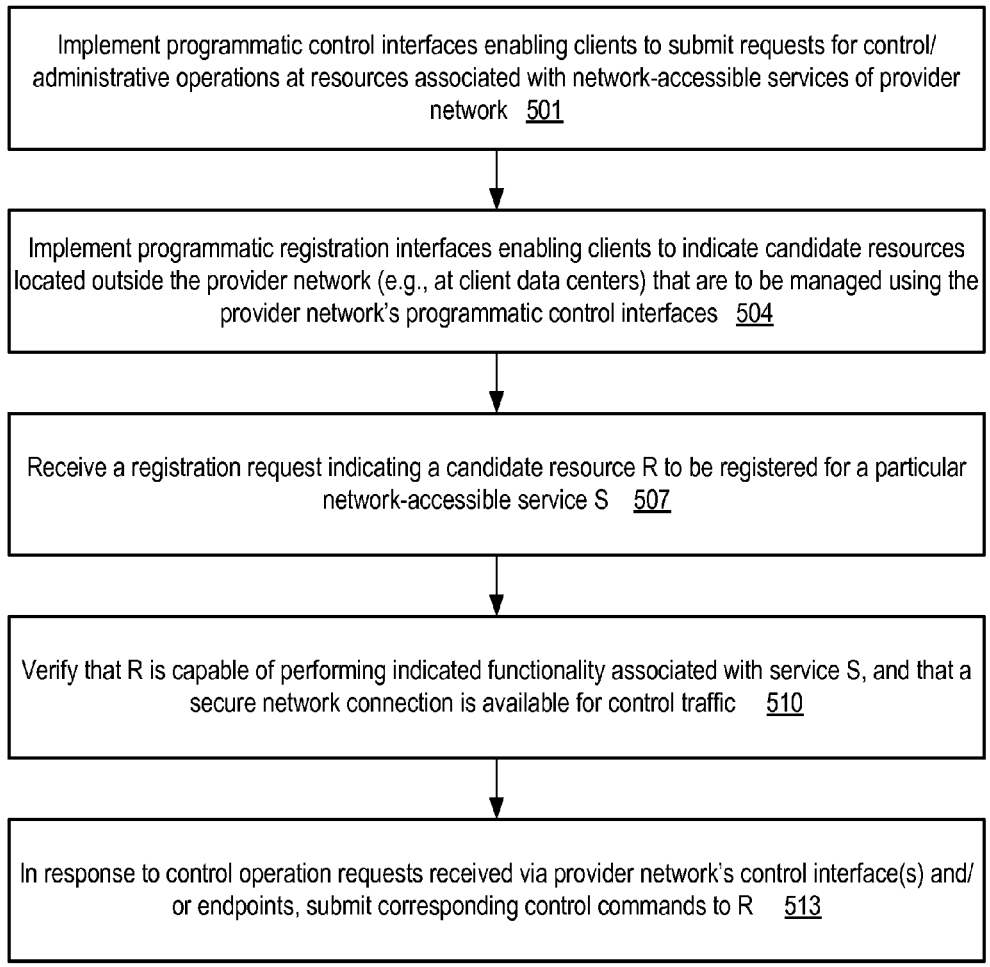
FIG. 5 is a flow diagram illustrating aspects of operations that may be performed to implement resource control at client data centers via provider-defined control interfaces, according to at least some embodiments.

FIG. 5 is a flow diagram illustrating aspects of operations that may be performed to implement resource control at client data centers via provider-defined control interfaces, according to at least some embodiments. As shown in element 501, a provider network may implement a set of programmatic control interfaces, such as APIs, web-based consoles, command-line tools, or graphical user interfaces, that enable clients to submit (and receive response to) control operation requests directed at provider network resources at which various network-accessible services are implemented.

A set of registration interfaces may also be implemented, enabling clients to indicate candidate resources that are to be managed using the control interfaces of the provider network (element 504), e.g., by logically extending the control plane of the provider network into client data centers. A client may submit a resource registration request via the registration interfaces e.g., to a registration manager 180, indicating a set of resources and the categories of control operations associated with one or more services for which the resources are to be registered. Such a registration request may be received, indicating that a given resource R at a location external to the provider network is to be registered for a particular service S (i.e., that control operation requests associated with service S, submitted via the control interfaces of the provider network, are to result in commands being transmitted to R) (element 507). Various different types of resources may be candidates for registration in different embodiments, such as hosts at which compute instances of a virtualized computing service or database instances of a distributed database service may be launched, storage devices at which block-level volumes or other types of storage objects may be created, and so on.

In response to the registration request, the registration manager may verify that the resource R is capable of performing the required functionality associated with service S in the depicted embodiment (element 510). In some cases, tests may be run at the candidate resources to verify the functionality, e.g., by the registration manager or by an intermediary acting on behalf of the registration manager. If the candidate resources are found acceptable, they may be registered as requested. Subsequently, when a control operation request directed to R is received via a control interface of the provider network, e.g., via a console or an API invocation directed to a control endpoint of the provider network, a corresponding control command may be submitted to R (element 514). In some implementations, verification of resource R's capabilities may not be necessary, e.g., if all the candidate resources have identical capabilities and there is thus no ambiguity regarding the functionality supported by any given resource.

Figure 6:
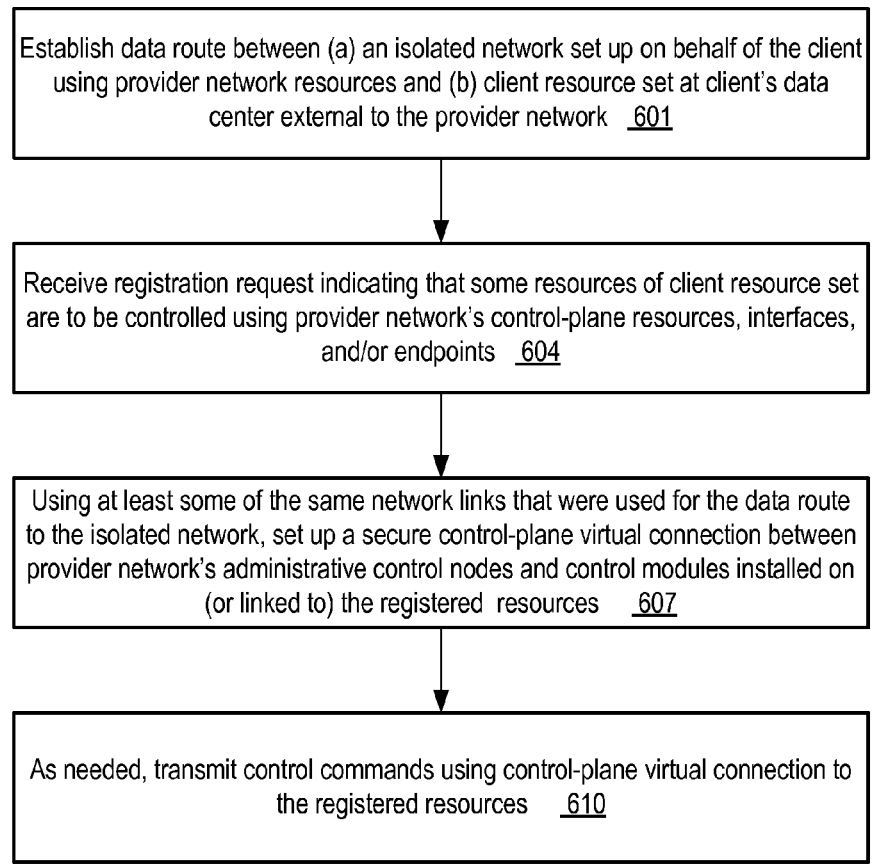
FIG. 6 is a flow diagram illustrating aspects of operations that may be performed to use, for control operations, a previously-configured data route between client-premise resources and provider network resources, according to at least some embodiments.

As described earlier in the context of FIG. 2, in some embodiments network links or paths may be shared for data and control. FIG. 6 is a flow diagram illustrating aspects of operations that may be performed to use, for control operations, a previously-configured data route between client-premise resources and provider network resources, according to at least some embodiments. As shown in element 601, a dedicated data route may first be established in the depicted embodiment between (a) an isolated virtual network (IVN) established using provider network resources on the client's behalf and (b) some set of client resources at a data center external to the provider network. The data route may, for example, involve establishing connectivity using one or more network links between a router configured for the external resources, and a provider network gateway (such as a virtual private gateway set up on behalf of the client) configured for the IVN.

At some point after the data route is set up, the client may wish to extend the provider network's control plane functionality into the external data center. Accordingly, the client may submit a registration request, indicating that one or more resources located at the external data center are to be registered for control via the provider network's control interfaces, endpoints or other resources associated with the provider network control plane (element 604). In the depicted embodiment, a secure control-plane virtual connection (such as a VPN connection) may be established between an administrative or control node of the provider network (associated with one or more network-accessible services of the provider network, and located within the provider network) and one or more control modules installed within the external data center (e.g., at the registered resources themselves, or on devices linked via network connections to the registered resources). As indicated in element 607, at least one network link that was being used for the data route may be re-used for the secure control-plane virtual connection. Any appropriate secure networking protocol may be used for securing the connection, such as TLS, SSL, or IPSec. In some embodiments, as illustrated in FIG. 2, a proxy may be used on the provider network side, e.g., between the service controllers and the gateway.

After the resources have been registered, and the secure connection has been established, control commands to the registered resources may be issued from the administrative resources within the data center using the secure connection (element 610), e.g., in response to control operation requests issued by clients. It is noted that at least in some embodiments, the sharing of network links, routes, or other networking resources for data and control purposes need not require that the data route be set up first as illustrated in FIG. 6. Instead, in some such embodiments, it may be the case that the secure control-plane connection is established first, and that a data route is established later. In at least one embodiment, an IVN need not be set up for network links or paths to be shared for data and control traffic. The data traffic may be isolated from the control traffic using any desired mechanisms in various embodiments.

Figure 7:
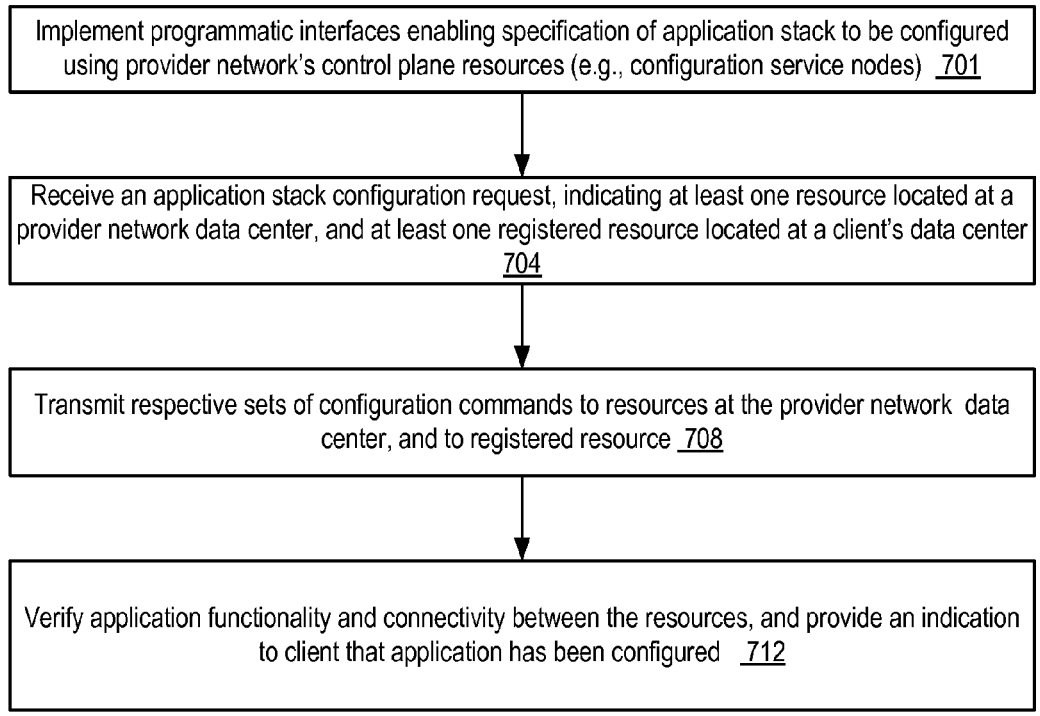
FIG. 7 is a flow diagram illustrating aspects of operations that may be performed to configure an application using a combination of provider network resources and external resources, according to at least some embodiments.

A described earlier, in at least some embodiments, a provider network may implement an application stack configuration service, and such a service may be used to configure applications that utilize a mix of provider network resources as well as client-side resources in at least some embodiments. FIG. 7 is a flow diagram illustrating aspects of operations that may be performed to configure an application using a combination of provider network resources and external resources, according to at least some embodiments. As shown in element 701, a set of programmatic interfaces (such as APIs, command-line tools, web-based interfaces, or graphical user interfaces) may be implemented to enable clients to submit application stack configuration requests to control-plane resources of the provider network such as control nodes of the stack configuration service. The stack configuration requests may include, for example, scripts or templates describing configuration requirements of various components of a multi-layer application, such as the types and numbers of compute resources needed, the amount and type of physical storage resources to be configured for the components, and so on.

A particular application stack configuration request may be received via one of the programmatic interfaces (element 704), indicating that a given application is to utilize at least one resource within a provider network data center or availability container, and at least one resource located outside the provider network (e.g., at a client data center or a client-defined availability container) and registered to receive control commands via the provider network's control plane. In response to such a request, the application stack configuration service may transmit the corresponding sets of configuration commands to the appropriate resources within and outside the provider network (element 707). After the configuration commands complete, in at least some embodiments the functionality and connectivity between the components of the application may be verified (element 710), and an indication such as an "application configuration complete" message may be provided to inform the client that the application has been successfully configured. If one or more of the configuration commands fail, in some implementations any remaining portions of the application stack that were successfully configured may be un-configured, and the client may be informed accordingly.

Figure 8:
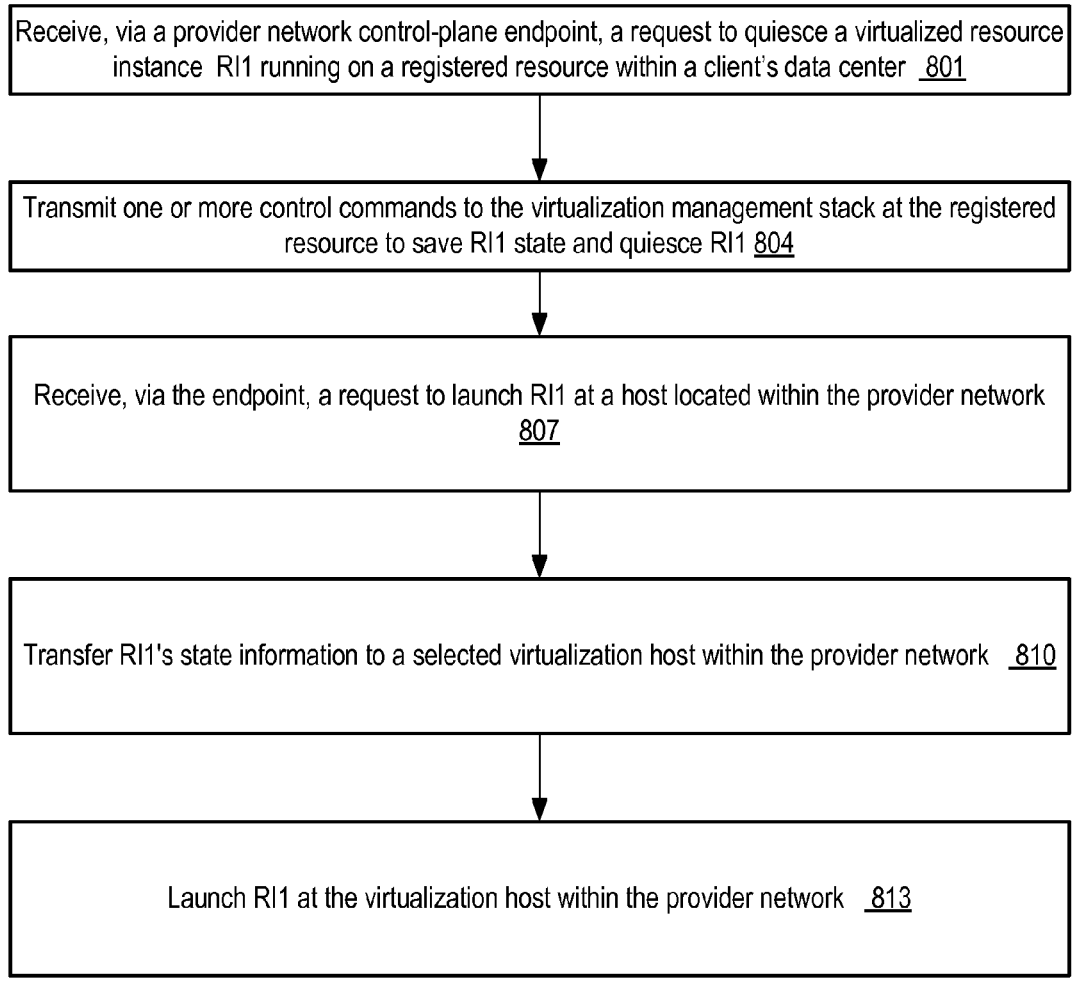
FIG. 8 is a flow diagram illustrating aspects of operations that may be performed to quiesce virtualized resources at a data center external to the provider network, and re-instantiate the resources within the provider network, according to at least some embodiments.

After a client has registered client-side resources running a given application using the control-plane extensions described herein, and has gained some experience using the provider network's control interfaces, at some point the client may wish to transition to using provider network resources. In some cases, the ability to seamlessly pause and restart virtualized resources, supported by various network-accessible services of the provider network, may be used for such transitions. FIG. 8 is a flow diagram illustrating aspects of operations that may be performed to quiesce virtualized resources at a data center external to the provider network, and re-instantiate the resources within the provider network, according to at least some embodiments. As shown in element 801, a request may be received via a provider network control-plane endpoint (such as an administrative console associated with a virtualized computing service) to quiesce (e.g., save the state of, and pause the execution of) a virtualized resource instance RI1 that is currently instantiated at a registered client-side resource. One or more control commands may then be issued, e.g., to a module of a virtualization management software stack running at the registered resource via a secure connection, to save RI1's state information and quiesce RI1's current execution (element 804).

A request to re-instantiate the quiesced instance RI1 at a host within the provider network may be received at the endpoint (element 807). A virtualization host located at a data center of the provider network may be identified, and the saved state information may be transmitted to the virtualization host (element 810). Using the state information, RI1 may be launched at the virtualization host within the provider network (element 813). For the perspective of the client, the application now being executed using RI1 within the provider network may appear to be largely or fully indistinguishable from the application that was earlier being run using RI1 instantiated within the external data center.

Managing Pooled Client-Side Resources Using Provider-Defined Control Interfaces

In some embodiments, the control plane of a provider network may be extended at several logical or hierarchical levels into the infrastructure at external data centers. For example, at one level, individual registered resources (such as virtualization hosts or storage devices) of the external data centers may be controlled from provider-defined interfaces, e.g., using modules included within the virtualization management stacks at the individual resources. At another level, a hierarchy of groups or pools of resources at the external data center may be controlled from a single appliance or device at which control modules compatible with the provider network interfaces are installed, without necessarily requiring the grouped resources themselves to have any additional modules installed. For example, in one embodiment in which a load balancing service is supported by the provider network, an external data center may include a pool of virtual or physical load balancers that can be managed using an appliance located within the external data center and connected to the load balancing service via a secure connection. Commands may be sent from service controllers located within the provider network to the appliance via the secure connection in response to client requests received via programmatic interfaces of the load balancing service. The appliance may, for example, activate more load balancers assigned to a given client-side application as the application's workload increases, deactivate or reassign some load balancers if the workload decreases, and so on. The commands issued by the appliance to the pooled resources may use industry standard protocols in at least some embodiments, such as SNMP, so that no modifications need be made at the pooled resources themselves to accommodate the control plane extensions of the provider network. Similar appliances or devices may be set up for other types of pooled-resource services as well, such as distributed cache services, distributed database services, network address discovery services, and the like. In some embodiments, communications between service administrative components (e.g., service controllers) located within the provider network and the appliances may be formatted in accordance with industry standards such as JMX (the Java™ Management Extensions architecture).

Figure 9:
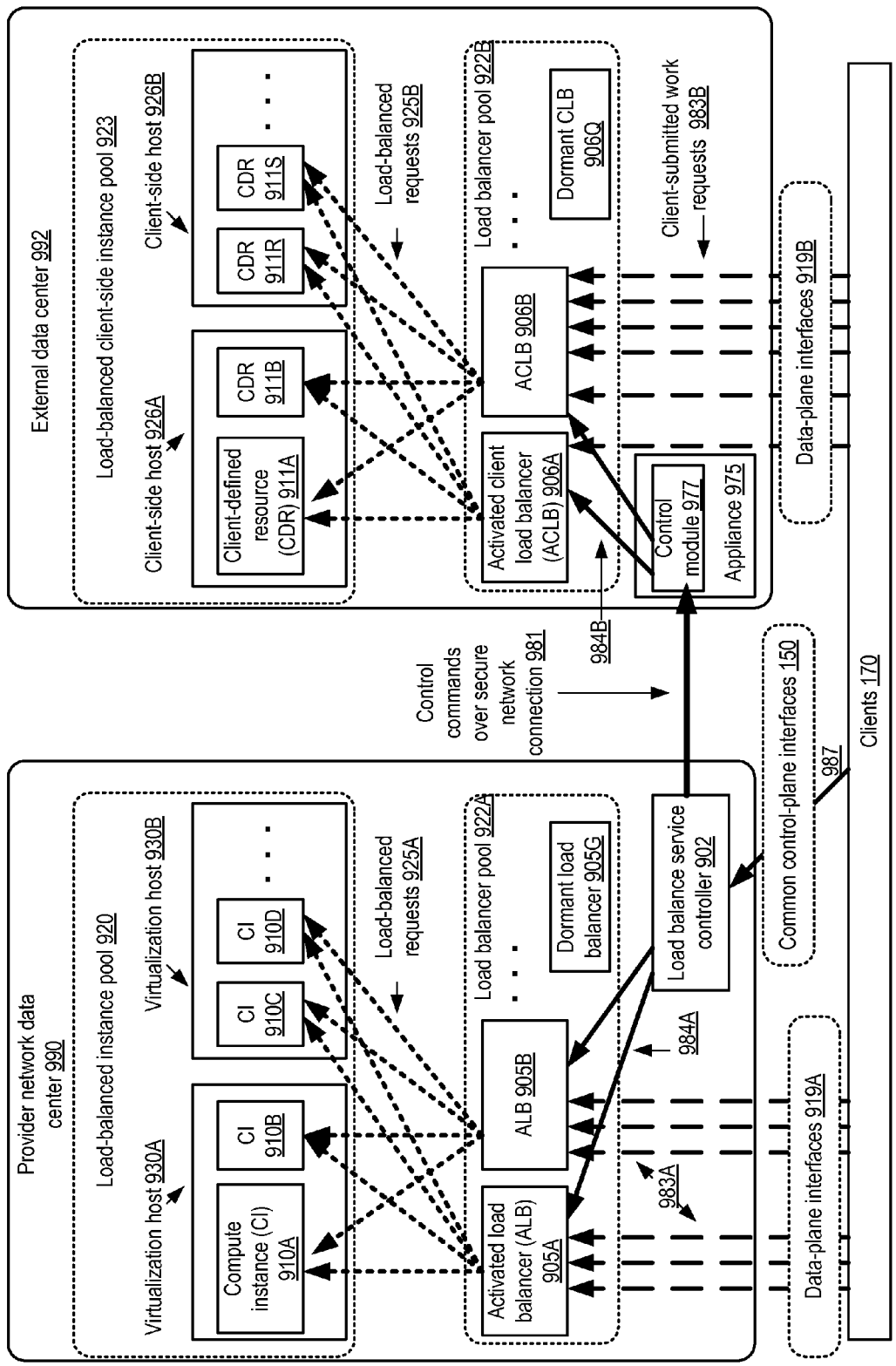
FIG. 9 illustrates an example of a system in which a provider network service is configured to manage resource pools that include resources at external data centers, according to at least some embodiments.

FIG. 9 illustrates an example of a system in which a provider network service (in this case, a load balancing service) is configured to manage resource pools that include resources at external data centers, according to at least some embodiments. Entities at two data centers are shown: a provider network data center 990, and an external (e.g., client-owned) data center 992. Within the provider network, a load balancer pool 922A comprising a plurality of virtual or physical load balancers 905 (e.g., load balancers 905A, 905B and 905G) is managed with the help of a controller 902 of the load balancing service in the depicted embodiment. At any given point in time, some of the load balancers of pool 922A may be in an activated state, e.g., assigned to distribute client workload for a particular application implemented at compute instances of load-balanced instance pool 920 in accordance with some set of load balancing criteria or policies. Thus, load balancers 905A and 905B have been activated to distribute workload requests 925A (corresponding to requests 983A received via data-plane interfaces 919A from clients 170) among the compute instances 910A, 910B, 910C and 910D instantiated at virtualization hosts 930A and 930B of load-balanced instance pool 920. Other load balancers of pool 922A, such as load balancer 905G, may be in a dormant state (e.g., unassigned to an application). Control commands 984A may be issued by controller 902 to manage various aspects of the load balancer pool 922A, such as changing the activation state of individual load balancers 905 from active to dormant or vice-versa, reassigning load balancers among different applications, or changing the number of load balancers in the pool 922A.

In the embodiment depicted in FIG. 9, a secure network connection has been established between the load balance service controller 902, and a control module 977 installed at an appliance 975 located in the external data center 992. In some cases an appliance 975 may be dedicated to a single provider network service, e.g., different appliances may be required for different services. In at least one embodiment, a client may indicate a host in the client network that is to serve as the appliance 975 for a service, and the appropriate control modules 977 may be installed thereon, e.g., using packages obtained from the provider network or transmitted by service controllers of the provider network. The client data center includes another load balancer pool 922B with a plurality of virtual or physical client load balancers (CLBs) 906 that may be configurable to balance the workload directed to some set of client applications. For example, clients 170 may submit work requests 983B directed to one or more applications implemented with the help of client-defined resources (CDRs) 911A, 911B, 911R and 911S instantiated at hosts 926A and 926B. The client-submitted work requests may be distributed (as indicated by arrows 925B) among the CDRs 911 by a subset of load balancers 906 (e.g., 906A and 906B) that have been activated as a result of commands 984B issued by appliance 975 at the direction of controller 902. The load balancer pool 922B may also include some dormant or unassigned client load balancers at a given point in time, such as CLB 906Q.

In the embodiment depicted in FIG. 9, clients 170 may submit control operation requests 987 of various kinds (e.g., requests specifying the set of client-side load balancers to be managed, or requests specifying the set of provider network load balancers to be managed) directed to the load balancing service via a common set of control plane interfaces 150. The load balance service controller 902 may generate commands corresponding to the client operation requests 987. Depending on the nature and targets of the client requests 987, some of the controller commands may be directed within the provider network (e.g., commands 984A), while others may be directed to the external data center (e.g., commands 981 directed to appliance 975, which in turn transmits commands 984B to the client-side load balancer pool members. It is noted that the load balancers themselves may not necessarily use the same techniques (or the same types of hardware or software) within the external network as are used for load balancers within the provider network. Thus, for example, a given client may prefer to use hardware load balancers 906 produced by vendor V1, while the provider network's load balancing service may utilize a different type of load balancer 905, produced by vendor V2 or custom-implemented for the provider network. The types of commands issued to load balancers 905 inside the provider network may differ from those issued to load balancers 906 outside the provider network, e.g., a different protocol may be used, or a different set of policies may be used.

In at least some embodiments, clients may register individual client-side resources to be controlled via one set of provider network control interfaces, as well as pools of client-side resources to be controlled via another set of provider network control interfaces. For example, in the embodiment shown in FIG. 9, some or all of the CDRs 911 may themselves be registered for control via interfaces associated with the provider network's virtualized computing service, while the appliance 975 and/or client load balancers 906 may be registered for control via interfaces associated with the provider network's load balancing service.

In different embodiments, respective sets of programmatic control interfaces may be implemented for various types of pooled-resource services that have been set up in the provider network to manage activation status of resources (e.g., whether a given load balancer, cache instance, or database instance is activated or dormant, and if it is activated, to which particular client or application it is assigned). Clients may submit configuration requests to the pooled-resource services via such interfaces, and the client requests may be translated into the appropriate commands by service administrative resources similar to controllers 902. Clients may submit pool management requests using the programmatic interface(s) in at least some embodiments, indicating one or more resources (either within the provider network or at a location outside the provider network) whose activation status within a particular pool is to be managed by the corresponding service. For example, a pool management request in one implementation may indicate a pool identifier (e.g., "Application A load balance pool"), a set of clients-side resources that are already members, or are to be made members of the pool, (e.g., ":LB3405A.domainname.com (IP address A.B.C.1)", ":LB3405B.domainname.com (IP address A.B.C.5), . . . ", and optionally parameters such as resource activation/deactivation criteria, a maximum pool size, a minimum pool size, or minimum and maximum constraints on the number of resources of the pool that are activated at any given time. A secure network connection may be established from the controller or a similar administrative resource of the service, located within the provider network, to a control module (such as module 977) instantiated on behalf of the service at the data center external to the provider network, in effect extending the control plane for the service.

In at least some embodiments, in accordance with at least one resource activation criterion indicated in a pool management request, some number of resources (either the client-side resources, or the provider network resources) may be activated via the control module to respond to one or more types of work requests, such as client work requests 983. Depending on the specific service, different types of criteria governing resource activation status changes may be specified by clients. For example, in the case of a load balancing service, a client may wish to have new load balancers activated when the existing load balancers' CPU utilization level exceeds X % for some time period T, and the client may wish to deactivate load balancers if the average CPU utilization level remains below y % for some time period. Similarly, for a distributed caching service, additional caches may be activated, or the sizes of existing cache instances may be increased, if the cache miss rate of an application exceeds a threshold, or if the I/O workload at some set of backing storage devices of the caches increases beyond a threshold. Other service-specific activation status change criteria may be used for various pooled-resource services, such as network address discovery services (whose resources may provide similar functionality as DNS nodes), automated resource recruitment services (e.g., services that automatically add compute or storage instances to an application as needed, depending on measured or anticipated workload levels), distributed database services (in which new database instances may be spun up based on specified activation criteria), or services whose nodes are designed to generate security artifacts such as cryptographic keys or certificates as needed. In at least one embodiment, in addition to or instead of activation status changes for resources that have already been configured as pool members, the client may issue control operation requests to enlarge or shrink a specified pool, e.g., by requesting additional hosts from other entities or services of the client network or the provider network, or by re-assigning existing pool members to other tasks. In making adjustments to pool size in such embodiments, the client-side control module may be required to conform to previously-specified pool size constraints (if any) such as a maximum or minimum pool size limit.

Figure 10A:
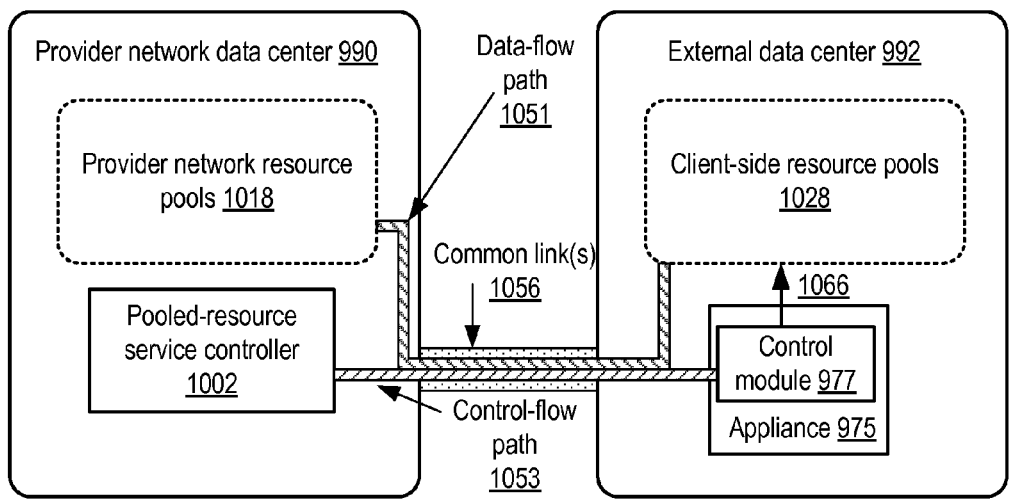
FIGS. 10a and 10b respectively illustrate two alternatives for control flow that can be used for pooled-resource services whose control planes are extended from provider networks into external data centers, according to at least some embodiments.
Figure 10B:
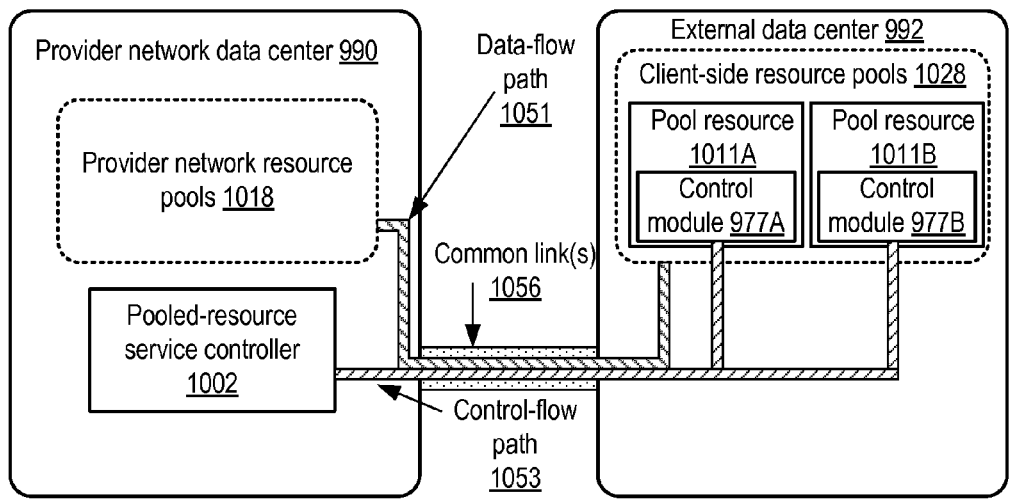

FIGS. 10*a* and 10*b* respectively illustrate two alternatives for control flow that can be used for pooled-resource services whose control planes are extended from provider networks into external data centers, according to at least some embodiments. In one approach, as shown in FIG. 10a (and also in FIG. 9), secure connections (e.g., using SSL, TLS, IPSec or any other appropriate protocol) may be made between a pooled-resource service controller 1002 at a provider network data center 990 and a control module 977 at a dedicated appliance 975 located in an external data center 951. Common network links 1056 may be shared for data traffic and control traffic in the embodiment depicted in FIG. 10a. A data-flow path 1051 between provider network resource pools 1018 (e.g., resource pools within an isolated virtual network set up for a client, similar to the IVN 221 illustrated in FIG. 2) and client-side resource pools 1028 may be established, with at least a portion of the data traffic flowing over network links 1056 through which control traffic also flows. The control traffic may be isolated from the data traffic using a VPN, for example. Within the client data center 992, the appliance 975 may serve as the intermediary between the service controller 1002 and the client-side resource pools, e.g., receiving instructions from the controller 1002 and translating them into commands 1066 that are understood by the members of the client-side pools. In the approach illustrated in FIG. 10a, no additional modules need be installed or included at the resources within client-side resource pools 1028.

A different approach to extending the provider network control plane is illustrated in FIG. 10b. Here, respective control modules 977A and 977B are installed or configured at the pool resources 1011A and 1011B, and as a result the pooled resource service controller 1002 may not need an intermediary such as appliance 975. Instead, the controller 1002 may communicate directly with the modules 977A and 977B at the pool resources. Once again, as in the case of FIG. 10a, common network links 1056 may be used for both data traffic and control traffic in the depicted embodiment. In some embodiments, a given client may wish to use the programmatic control interfaces of each of several pooled-resource services within the same external data center, and each such service may require at least one dedicated appliance located in the client data center if the approach illustrated in FIG. 10a is used. To avoid the expense of the appliances, in some embodiments a client may opt for the alternative approach shown in FIG. 10b, which has its own overhead of installing/configuring the control modules 977 but does not require dedicated appliances. In some embodiments, a single appliance may be shared for more than one pooled-resource service. In at least one embodiment, a hybrid approach combining aspects of both GIG. 10a and 10b may be used, in which some pooled resources have control modules 977 and an appliance is used for another subset of pooled resources.

Resource Pool Examples

Figure 11:
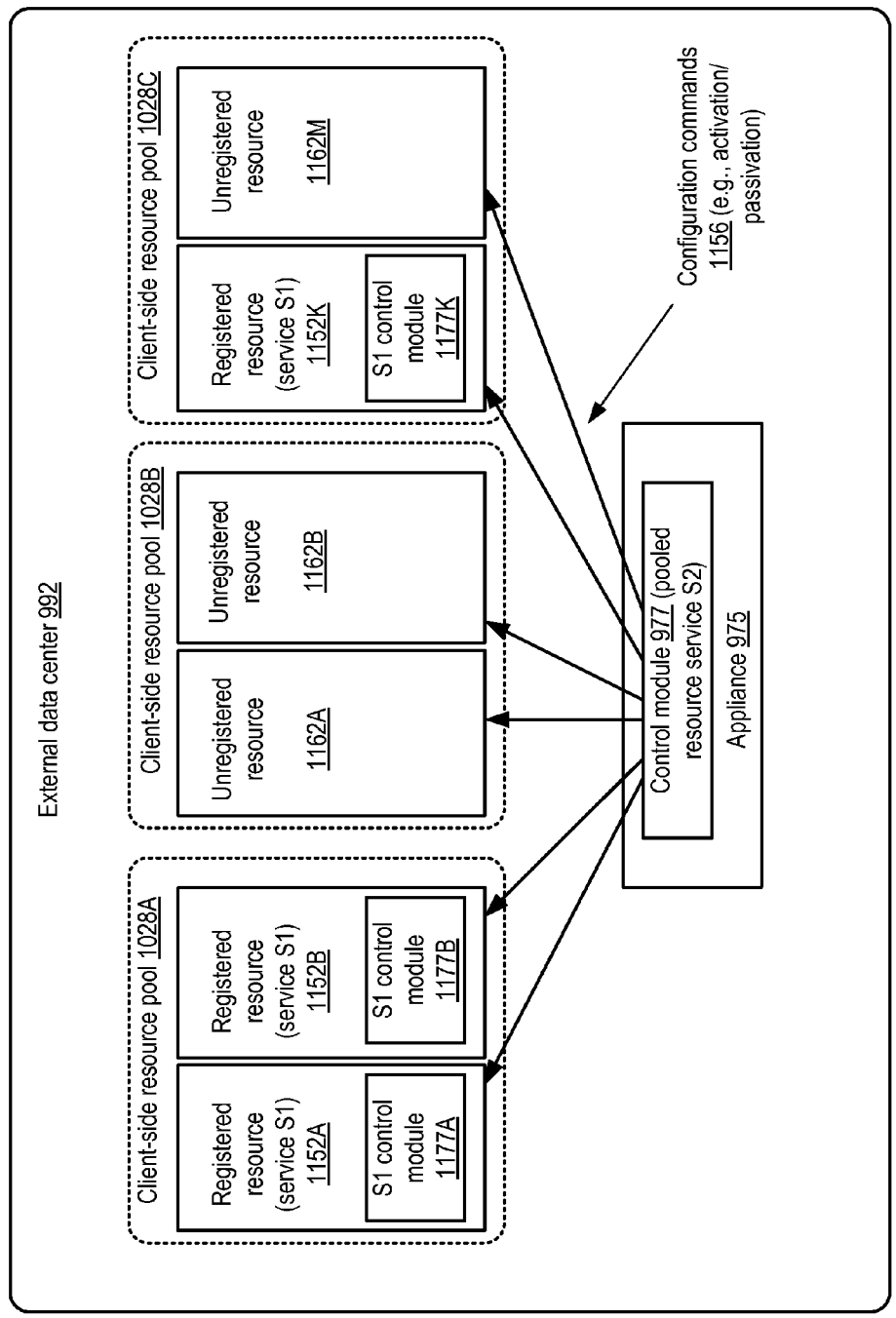
FIG. 11 illustrate examples of types of resource pools at a data center external to a provider network, according to at least some embodiments.

As noted earlier, in at least some embodiments, some of the resources within the client-side pools that are managed using provider network control interfaces may themselves be registered for control via another set of provider network control interfaces. As a result, client-side resource pools may themselves comprise some combination of registered and unregistered members in such embodiments. FIG. 11 illustrate examples of types of resource pools 1028 at a data center external to a provider network, according to at least some embodiments. As shown, client-side resource pool 1028A comprises resources 1152A and 152B, which are each registered for control interfaces associated with a service S1, and each of which comprise a respective control module 1177 associated with S1, and is thus able to implement commands formatted in accordance with a programmatic control interface of S1. For example, in some embodiments resources 1152A and 1152B may each comprise a virtualization host, S1 may be a virtualized computing service, and modules 1177A and 1177B may respectively comprise elements of a virtualization management software stack. Control module 977 associated with pooled resource service S2 (such as a load balancing service) may be configured to transmit control/configuration commands 1156 (such as activation/passivation commands) to registered resources 1152A and 1152B.

While some of the client-side resource pools such as pool 1028A may be comprised entirely of registered resources, other client-side resource pools such as 1028B may comprise unregistered resources such as 1162A and 1162B, which may not have any control modules associated with service S1 (or any other service of the provider network). Such unregistered resources may be unable to implement commands formatted in accordance with a programmatic control interface of a provider network service. A third category of resource pools may comprise both registered resources (such as resource 1152K with S1 control module 1177K) and unregistered resources (such as resource 1162M). In some cases, a given pooled resource may comprise control modules of several services, and thereby be registered to receive control commands associated with each of the services. Control module 977 associated with pooled-resource service S2 may be configured to communicate equally effectively with both registered and unregistered pooled resources in the depicted embodiment.

Figure 12:
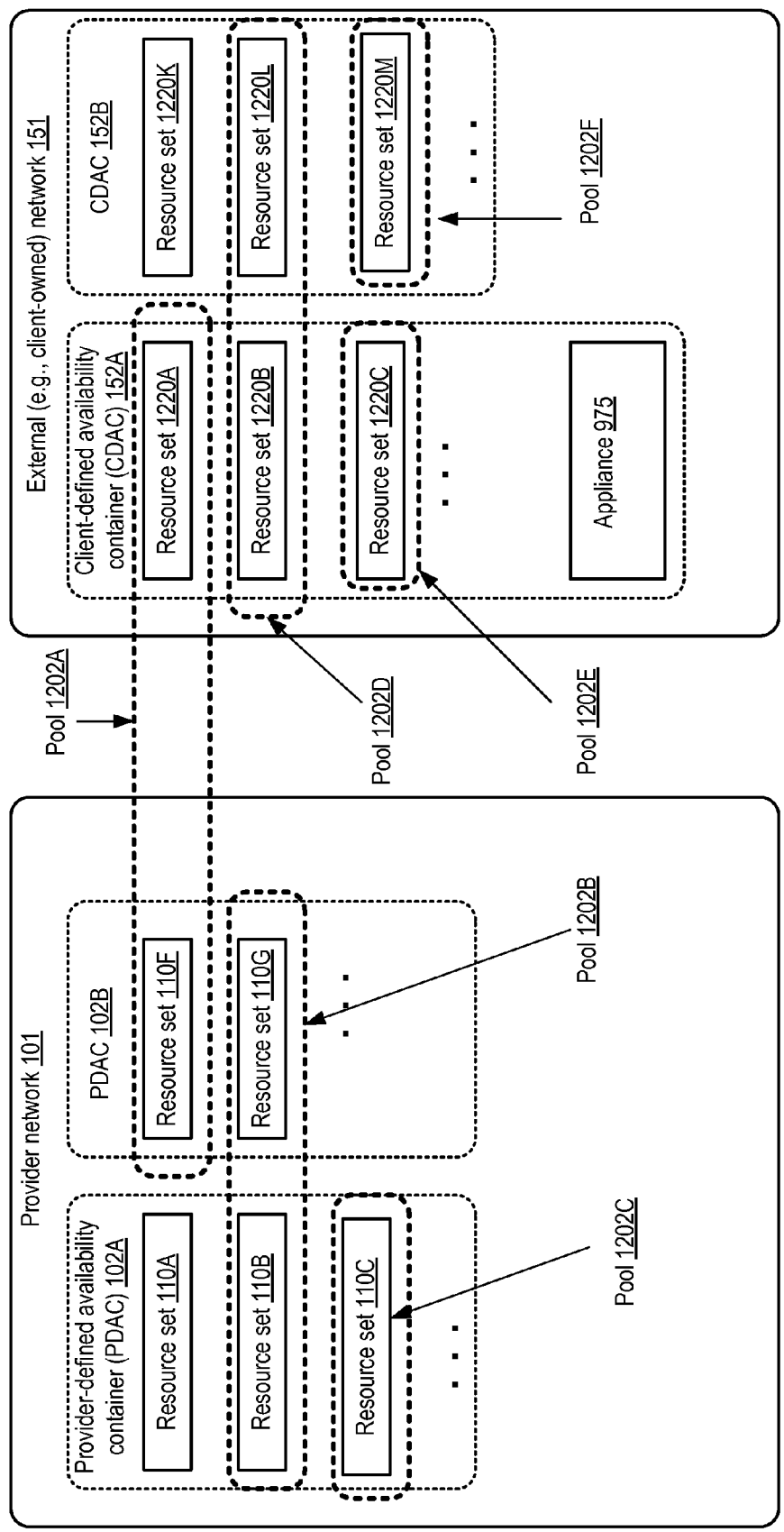
FIG. 12 illustrate examples of pool configurations that may span multiple availability containers, according to at least some embodiments.

FIG. 12 illustrate examples of pool configurations that may span multiple availability containers, according to at least some embodiments. As shown, provider network 101 comprises provider-defined availability containers (PDACs) 102A and 102B, while client network 151 comprises client-defined availability containers 152A and 152B in the depicted embodiment. An appliance 975 may be configured to respond to client-submitted control operation requests by submitting corresponding control commands (such as resource activation and deactivation commands) to pooled resources. A number of different types of resource pools may be configured and managed with the help of appliance 975 in the depicted embodiment. For example, some pools such as pool 1202A may comprise resources located in the client network 151 (such as resource set 1220A in CDAC 152A) as well as resources located in the provider network 101 (such as resource set 110F in PDAC 102B). Pools such as 1202B may comprise resources within more than one PDAC (e.g., resource sets 110B and 110G in PDACs 102A and 102B). Pool 1202C may comprise resource set 110C which is confined to a given PDAC, and pools 1202E and 1202F may comprise respective resource sets 1220C and 1220M within CDACs 152A and 152B. Some resource pools controlled via appliance 975, such as pool 1202D, may include respective resource sets at more than one CDAC (such as resource sets 1220B and 1220L at CDACs 152A and 152B respectively.) In the depicted embodiment, pooled resources managed with the help of control modules added to an appliance may reside in any combination of availability containers or data centers, independently of the location of the appliance itself, as long as the types of secure connections described above for control traffic can be established.

Methods for Controlling Client-Side Pooled Resources

Figure 13:
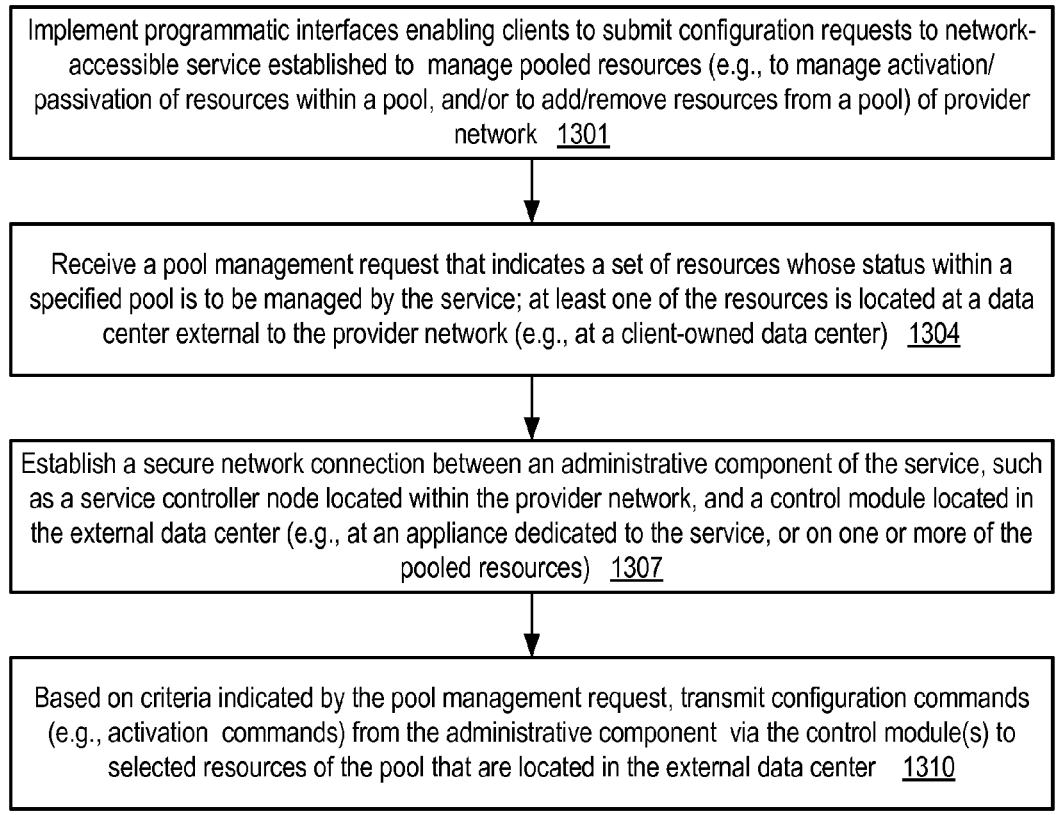
FIG. 13 is a flow diagram illustrating aspects of operations that may be performed to support management of pooled resources at locations outside a provider network, using a service implemented within the provider network, according to at least some embodiments.

FIG. 13 is a flow diagram illustrating aspects of operations that may be performed to support management of pooled resources at locations outside a provider network, using a service implemented within the provider network, according to at least some embodiments. As shown in element 1301, a set of programmatic interfaces enabling clients to submit configuration requests to network-accessible services established at a provider network to manage pooled resources (e.g., to manage activation/passivation of resources within a pool, and/or to add/remove resources from a pool) may be implemented. Examples of such services may include, for example, load balancing services, distributed caching services, distributed databases, network address discovery services, and the like.

A pool management request that indicates a set of resources whose status within a specified pool is to be managed by the service may be received (element 1304). At least one of the resources may be located at a data center external to the provider network (e.g., at a client-owned data center) in the depicted embodiment. The pool management request may also include various criteria or rules to be used to change the activation status of the resources, e.g., the types of performance metrics to be tracked to determine when additional resources are to be activated, and the specific values of the metrics that are to serve as triggers for state changes.

A secure network connection may be established between an administrative component of the service, such as a service controller node located within the provider network, and a control module located in the external data center (e.g., at an appliance dedicated to the service, or on one or more of the pooled resources) may be established (element 1307). Any appropriate protocol or protocols may be used to secure the connection, such as SSL, TLS, or IPSec. The secure network connection may use network resources such as one or more links that are also used for data traffic between the provider network and the external data center in some embodiments. The control module may have been preinstalled on the appliance or on other devices, e.g., by partner vendors of the provider network operator, or may be installed as needed by transferring installation packages from the provider network. Based on criteria indicated by the pool management request, the appropriate configuration commands (e.g., activation commands) may be transmitted from the administrative component via the control module(s) to selected resources of the pool that are located in the external data center (element 1310). The configuration commands may be formatted in accordance with any of various standards-based protocols in some embodiments, such as SNMP.

Figure 14:
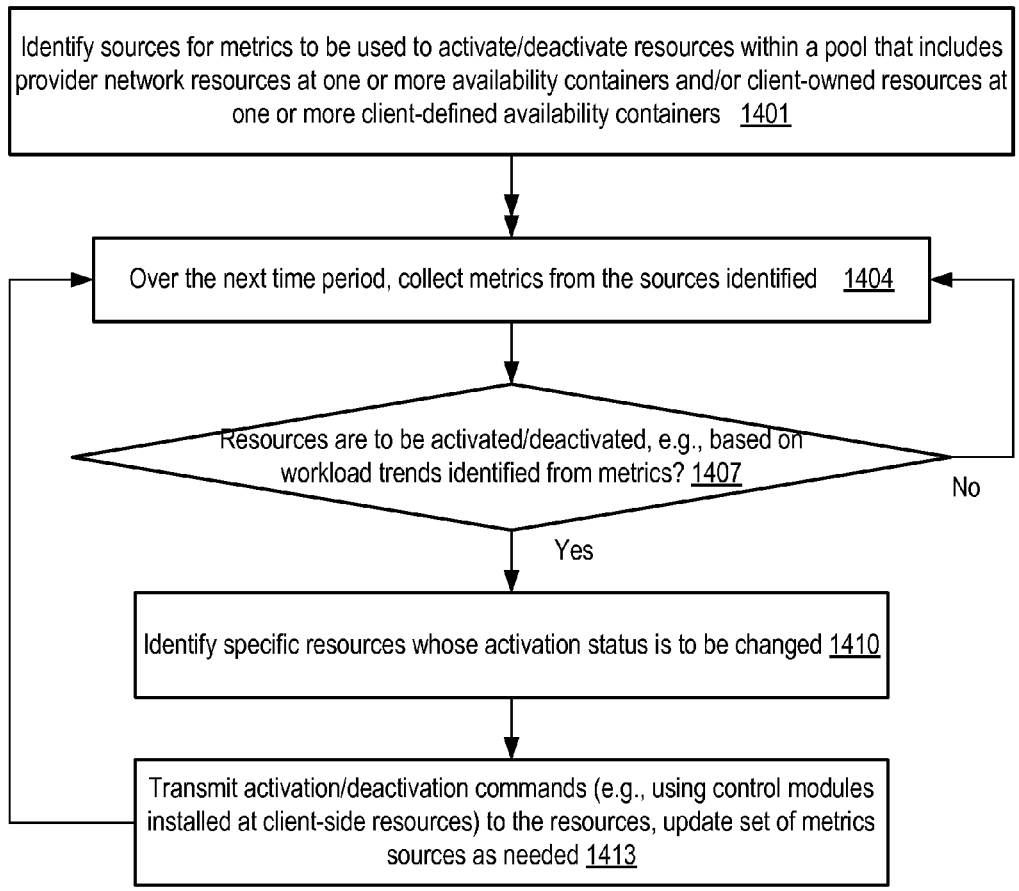
FIG. 14 is a flow diagram illustrating aspects of operations that may be performed to change activation states of resources within resource pools, according to at least some embodiments.

FIG. 14 is a flow diagram illustrating aspects of operations that may be performed to change activation states of resources within resource pools, according to at least some embodiments. As shown in element 1401, a set of sources for metrics to be used to activate/deactivate resources within a pool that includes provider network resources at one or more PDACs and/or client-owned resources at one or more CDACs may be identified. Such sources may include, for example, performance monitors or tools located at the resources themselves, tools that monitor application behavior and responsiveness remotely, and/or logs of various types. The identified metrics may be collected from the sources for a period of time (element 1404).

A decision may be made, using the metrics, as to whether any changes are to be made to the activation status of some or all of the pool resources, e.g., whether one or more resources are to be activated, deactivated, or reassigned. If such activation state changes are to be performed (as determined in element 1407), the specific resources to be targeted for state changes may be identified (element 1410). The appropriate configuration commands may be transmitted to the target resources, e.g., from a control module installed at a device external to the provider network (element 1413). In addition, in some embodiments the set of resources to be monitored for the next time interval may be modified. The monitoring for the next time period may then begin, and operations corresponding to elements 1404 onwards may be repeated. If no activation state changes are deemed necessary (as also determined in element 1407), operations corresponding to elements 1404 onwards may also be repeated for the next time interval.

It is noted that in various embodiments, operations other than those illustrated in the flow diagrams of FIGS. 5, 6, 7, 8, 13 and 14 may be implemented to support control plane extensions from the provider network to external networks, and that some of the operations shown may not be implemented, or may be implemented in a different order or in parallel rather than sequentially.

Use Cases

The techniques described above, of extending the reach of programmatic control interfaces of a provider network to cover resources located in client-side locations external to the provider network may be beneficial in a number of scenarios. For example, even though the popularity of cloud-based applications has grown, many enterprise applications continue to be restricted to client-side resources, due at least in part on the lack of experience of the enterprise IT staffs with respect to cloud operations. Enabling the IT staff to continue to run their applications within their own data centers, while using control interfaces supported by the provider network, may help overcome the reluctance of the staff to try more complete cloud-based applications. Many services built over time in the provider network in response to client demands, such as application stack configuration automation services, may also reduce the complexity of application management for client-side applications. The ability to transparently manage pooled resources regardless of location may allow applications to be scaled effectively as workload levels increase. Simplified techniques for transferring applications to provider network resources (e.g., by quiescing instances running on the client-side, and re-instantiating them within the provider network) may also lower IT costs at low risk.

Illustrative Computer System

Figure 15:
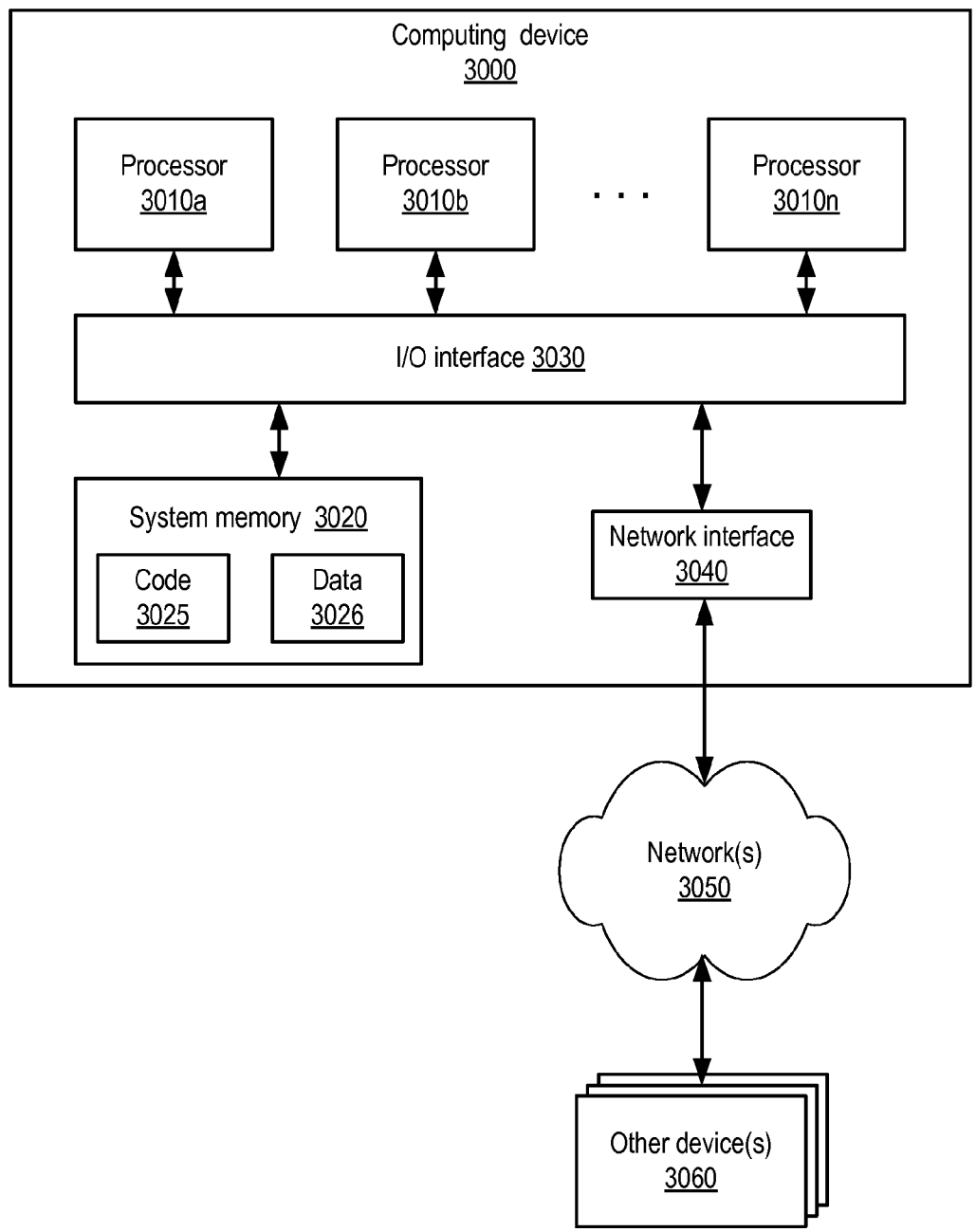
FIG. 15 is a block diagram illustrating an example computing device that may be used in at least some embodiments.

In at least some embodiments, a server that implements a portion or all of one or more of the technologies described herein, including the techniques to implement registration managers, registered and unregistered resources, administrative nodes such as controllers and appliances associated with various provider network services, and other elements of the control paths and the data paths, may include a general-purpose computer system that includes or is configured to access one or more computer-accessible media. FIG. 15 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 14, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 14 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising at least a processor and memory, wherein the one or more computing devices are configured to:
implement a first set of programmatic interfaces enabling a client to request a control operation associated with resources of one or more network-accessible services of a provider network;
implement a second set of programmatic interfaces enabling a client to transmit a resource registration request from the client to the provider network, wherein the resource registration request indicates one or more resources located at a data center external to the provider network as candidate targets for a category of control operation requests received via the first set of programmatic interfaces, wherein the category of control operation requests are associated with at least a particular network-accessible service of the one or more network-accessible services;
receive a particular resource registration request via the second set of programmatic interfaces, indicating a particular resource located at the data center external to the provider network;
verify functionality of one or more modules of a management software stack installed at the particular resource;

establish a secure network connection between a particular module of the one or more modules at the particular resource, and an administrative resource located within a data center of the provider network; and in response to a particular control operation request of the category of control operation requests received via a programmatic interface of the first set, transmit a control command from the administrative resource located within the data center of the provider network to the particular resource located at the data center external to the provider network via the secure network connection.

2. The system as recited in claim 1, wherein the particular network-accessible service comprises one of: a virtualized compute service, a block-level storage service, a storage service implementing a web-services interface for client operations, a database service, a batch-processing parallel computing service, or a load-balancing service.

3. The system as recited in claim 1, wherein the provider network comprises a plurality of availability containers including a first availability container and a second availability container with respective sets of infrastructure components and respective availability profiles, wherein the particular resource registration request comprises a request to designate a collection of resources, including the particular resource and another resource at the data center external to the provider network, as a different availability container than the first and second availability containers.

4. The system as recited in claim 1, wherein the one or more computing devices are further configured to:

transmit the control command to the particular resource via a network path that comprises a particular physical network link; and in response to a data transfer operation request directed at the particular resource, transfer data from the particular resource using a different network path that comprises the particular physical network link.

5. The system as recited in claim 4, wherein the one or more computing devices are further configured to:

establish a virtual private network (VPN) dedicated to traffic associated with control commands between the provider network and the data center external to the provider network.

6. A method, comprising:
performing, by one or more computing devices:
implementing a first set of programmatic interfaces enabling clients to request control operations associated with resources of one or more network-accessible services of a provider network;
implementing a second set of programmatic interfaces enabling a particular client to transmit a registration request from the particular client to the provider network, wherein the registration request indicates one or more resources located at a data center external to the provider network as candidate targets for a category of control operation requests issued via the first set of programmatic interfaces, wherein the category of control operation requests pertain to a particular network-accessible service of the one or more network-accessible services;
receiving a particular registration request via a programmatic interface of the second set of programmatic interfaces, indicating a particular resource of the one or more resources located at the data center external to the provider network;
establishing a network connection between the particular resource and an administrative resource located within a data center of the provider network; and
in response to a particular control operation request of the category of control operation requests received via a programmatic interface of the first set, transmitting a control command from the administrative resource located within the data center of the provider network to the particular resource located at the data center external to the provider network via the network connection.

7. The method as recited in claim 6, wherein the particular network-accessible service comprises one of: a virtualized compute service, a block-level storage service, an object storage service implementing a web-services interface for client operations, a database service, a batch-processing parallel computing service, or a load-balancing service.

8. The method as recited in claim 6, wherein the provider network comprises a plurality of availability containers including a first availability container and a second availability container with respective sets of infrastructure components and respective availability profiles, wherein the particular controlled external resource group request comprises a request to designate a collection of resources at the data center external to the provider network as a different availability container.

9. The method as recited in claim 6, further comprising performing, by the one or more computing devices:

transmitting the control command to the particular resource via a network path that comprises a particular physical network link; and in response to receiving a data transfer operation request directed at the particular resource, transferring data from the particular resource using a different network path that comprises the particular physical network link.

10. The method as recited in claim 9, further comprising performing, by the one or more computing devices:

establishing a first virtual private network (VPN) dedicated to traffic associated with control commands between the provider network and the data center external to the provider network.

11. The method as recited in claim 6, further comprising performing, by the one or more computing devices:

establishing the network connection using a virtual private gateway established on behalf of the particular client.

12. The method as recited in claim 6, further comprising performing, by the one or more computing devices:

securing the network connection using one of: IPSec (Internet Protocol Security), TLS (Transport Layer Security), or SSL (Secure Sockets Layer).

13. The method as recited in claim 6, further comprising performing, by the one or more computing devices:

transmitting, to a destination device at the data center external to the provider network, an installable version of one or more modules of a software stack to be installed at the particular resource; and establishing the network connection from the administrative resource to a particular module of the one or more modules.

14. The method as recited in claim 6, further comprising performing, by the one or more computing devices:

quiescing, in response to one or more control operation requests received from the particular client, an execution of a particular virtualized compute instance at the particular resource; and re-instantiating the quiesced virtualized compute instance at a different resource within the provider network.

15. The method as recited in claim 6, further comprising performing, by the one or more computing devices:
receiving, at a configuration service node within the provider network, an application stack configuration request, comprising an indication of a first component and a second component of a particular application to be configured on behalf of the particular client, wherein the first component is to utilize a first resource located within the provider network, and the second component is to utilize a second resource located at the data center external to the provider network;
issuing respective configuration commands, in accordance with the application stack configuration request, from the configuration service node to the first resource and the second resource.

16. A non-transitory computer-accessible storage medium storing program instructions that when executed on one or more processors:
implement a first set of programmatic interfaces enabling a client to transmit a registration request from the client to a provider network, wherein the registration request indicates one or more resources located at a data center external to the provider network as candidate targets for a category of control operation requests issued via a different set of programmatic interfaces associated with a network-accessible service of the provider network;
establish a network connection between a particular resource indicated in a particular registration request, and an administrative resource located within a data center of the provider network; and
in response to a particular control operation request of the category of control operation requests received via a programmatic interface of the different set, transmit a control command from the administrative resource located within the data center of the provider network to the particular resource located at the data center external to the provider network via the network connection.

17. The non-transitory computer-accessible storage medium as recited in claim 16, wherein the network-accessible service comprises one of: a virtualized compute service, a block-level storage service, an object storage service implementing a web-services interface for client operations, a database service, a batch-processing parallel computing service, or a load-balancing service.

18. The non-transitory computer-accessible storage medium as recited in claim 16, wherein the provider network comprises a plurality of availability containers including a first availability container and a second availability container with respective sets of infrastructure components and respective availability profiles, wherein the particular registration request comprises a request to designate a collection of resources at the data center external to the provider network as a different availability container.

19. The non-transitory computer-accessible storage medium as recited in claim 16, wherein the instructions when executed on the one or more processors:
establish a virtual private network (VPN) dedicated to traffic associated with control commands between the provider network and the data center external to the provider network.

20. The non-transitory computer-accessible storage medium as recited in claim 16, wherein the particular resource comprises at least one of: a virtualized compute resource host, a storage appliance, or a load-balancing appliance.

* * * * *